(12) United States Patent
Kandula et al.

(10) Patent No.: US 10,218,639 B2
(45) Date of Patent: Feb. 26, 2019

(54) COMPUTING LONG-TERM SCHEDULES FOR DATA TRANSFERS OVER A WIDE AREA NETWORK

(71) Applicant: Microsoft Corporation, Redmond, WA (US)

(72) Inventors: Srikanth Kandula, Redmond, WA (US); Ishai Menache, Redmond, WA (US); Roy Schwartz, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 112 days.

(21) Appl. No.: 14/210,538

(22) Filed: Mar. 14, 2014

(65) Prior Publication Data

US 2015/0264135 A1    Sep. 17, 2015

(51) Int. Cl.
*H04L 12/937* (2013.01)
*H04L 29/08* (2006.01)
(Continued)

(52) U.S. Cl.
CPC ............ *H04L 49/254* (2013.01); *H04L 41/50* (2013.01); *H04L 45/02* (2013.01); *H04L 45/121* (2013.01);
(Continued)

(58) Field of Classification Search
CPC .......... H04L 5/00; H04L 5/003–5/0046; H04L 5/0058; H04L 5/0067; H04L 5/0071;
(Continued)

(56) References Cited

U.S. PATENT DOCUMENTS

| 5,615,254 A | * | 3/1997 | Qiu | ......................... H04Q 3/66 379/221.01 |
| 6,108,314 A | | 8/2000 | Jones et al. | |

(Continued)

FOREIGN PATENT DOCUMENTS

| WO | 02100023 A2 | 12/2002 |
| WO | 2004057882 A1 | 7/2004 |

(Continued)

OTHER PUBLICATIONS

Online Mixed Packing and Covering—Oct. 5, 2012—Azar et al.*
(Continued)

*Primary Examiner* — Tauqir Hussain
*Assistant Examiner* — Boris D Grijalva Lobos
(74) *Attorney, Agent, or Firm* — Medley, Behrens & Lewis, LLC

(57) ABSTRACT

Various technologies pertaining to scheduling network traffic in a network are described. A request to transfer data from a first computing device to a second computing device includes data that identifies a volume of the data to be transferred and a deadline, where the data is to be transferred prior to the deadline. A long-term schedule is computed based upon the request, wherein the long-term schedule defines flow of traffic through the network over a relatively long time horizon. A short-term schedule is computed based upon the long-term schedule, where devices in the network are configured based upon the short-term schedule.

20 Claims, 9 Drawing Sheets

(51) Int. Cl.
  *H04L 12/24* (2006.01)
  *H04L 12/911* (2013.01)
  *H04L 12/727* (2013.01)
  *H04L 12/801* (2013.01)
  *H04L 12/751* (2013.01)

(52) U.S. Cl.
  CPC ............ *H04L 47/12* (2013.01); *H04L 47/127* (2013.01); *H04L 47/72* (2013.01); *H04L 67/1078* (2013.01); *H04L 67/1095* (2013.01); *H04L 47/781* (2013.01)

(58) Field of Classification Search
  CPC . H04L 5/0075–5/0082; H04L 5/0091–5/0098; H04L 12/00; H04L 12/14–12/145; H04L 12/16; H04L 12/22; H04L 12/24; H04L 12/2414; H04L 12/2424; H04L 12/2464; H04L 12/2487; H04L 12/2697; H04L 12/28; H04L 12/46; H04L 12/50; H04L 12/52; H04L 29/00; H04L 29/02; H04L 41/00; H04L 41/02; H04L 41/04–41/046; H04L 41/08; H04L 41/0806; H04L 41/0813–41/0816; H04L 41/0823–41/0836; H04L 41/085–41/0859; H04L 41/0876–41/0886; H04L 41/0893; H04L 41/0896; H04L 41/12–41/147; H04L 41/50; H04L 41/5041–41/5054; H04L 43/00; H04L 43/08–43/0817; H04L 43/0876–43/0894; H04L 45/00–45/025; H04L 45/12–45/127; H04L 45/14; H04L 45/22; H04L 45/24; H04L 45/42; H04L 47/00; H04L 47/10; H04L 47/12; H04L 47/127; H04L 47/70–47/76; H04L 49/00; H04L 49/25–49/258
  See application file for complete search history.

(56) References Cited

U.S. PATENT DOCUMENTS

| | | | |
|---|---|---|---|
| 6,205,150 B1* | 3/2001 | Ruszczyk | H04L 47/564 370/412 |
| 6,760,328 B1 | 7/2004 | Ofek | |
| 7,376,121 B2* | 5/2008 | Dunagan | H04L 45/02 370/351 |
| 7,865,614 B2* | 1/2011 | Lu | H04L 29/06 370/503 |
| 7,983,923 B1* | 7/2011 | Schlaak | G06Q 10/06 705/1.1 |
| 8,346,845 B2* | 1/2013 | Khandekar | G06F 9/5027 709/201 |
| 8,365,173 B2 | 1/2013 | Lin et al. | |
| 8,368,698 B2* | 2/2013 | Gao | G06F 17/30864 345/440 |
| 8,412,822 B1* | 4/2013 | Weinman, Jr. | G06F 9/5027 709/201 |
| 8,583,467 B1 | 11/2013 | Morris et al. | |
| 8,787,154 B1* | 7/2014 | Medved | H04L 1/00 370/225 |
| 2002/0138691 A1* | 9/2002 | Yamamoto | G06F 21/6218 711/112 |
| 2003/0058798 A1* | 3/2003 | Fleischer | H04L 45/00 370/238 |
| 2005/0114860 A1* | 5/2005 | Lin | G06F 4/4887 718/100 |
| 2006/0120379 A1 | 6/2006 | Beshai | |
| 2006/0155642 A1* | 7/2006 | Pettersen | G06Q 20/10 705/39 |
| 2006/0271422 A1* | 11/2006 | Rakesh | G06Q 10/06 705/7.24 |
| 2008/0180445 A1* | 7/2008 | Peskin | G06T 11/20 345/440 |
| 2008/0225751 A1* | 9/2008 | Kozat | H04L 12/1881 370/254 |
| 2008/0279155 A1 | 11/2008 | Pratt, Jr. et al. | |
| 2009/0190541 A1* | 7/2009 | Abedi | H04W 16/10 370/329 |
| 2010/0041365 A1* | 2/2010 | Lott | G06Q 30/016 455/406 |
| 2010/0128703 A1* | 5/2010 | Brand | H04W 40/02 370/338 |
| 2011/0022538 A1* | 1/2011 | Jin | G06Q 10/04 705/348 |
| 2011/0154353 A1 | 6/2011 | Theroux et al. | |
| 2011/0295978 A1 | 12/2011 | Pazos et al. | |
| 2013/0117454 A1* | 5/2013 | Rangarajan | G06F 9/5011 709/226 |
| 2013/0179371 A1 | 7/2013 | Jain et al. | |
| 2013/0346227 A1* | 12/2013 | Jain | G06Q 30/08 705/26.3 |
| 2014/0038656 A1 | 2/2014 | Navda et al. | |
| 2014/0214474 A1* | 7/2014 | Balduccini | G06Q 10/06315 705/7.25 |
| 2015/0106324 A1* | 4/2015 | Puri | G06N 5/04 706/52 |
| 2015/0131444 A1* | 5/2015 | Malatack | H04M 7/0021 370/235 |

FOREIGN PATENT DOCUMENTS

| | | |
|---|---|---|
| WO | 2005094312 A2 | 10/2005 |
| WO | 2008127631 A1 | 10/2008 |

OTHER PUBLICATIONS

Flows with Unit Path Capacities and Related Packing and Covering Problems—May 21, 2009—Martens et al.*

Sherwani, et al., "Libra: An Economy driven Job Scheduling System for Clusters", In Proceeding of the 6th International Conference on High Performance Computing in Asia-Pacific Region, Dec. 16, 2002, 13 pages.

Buyya, "Economic-Based Distributed Resource Management and Scheduling for Grid Computing: Chapter 4:The Nimrod-G Grid Resource Broker and Economic Scheduling Algorithms", Ph.D Thesis, Apr. 12, 2002, Retrieved at: <<http://www.buyya.com/thesis/gridbroker.pdf>>, pp. 47-80.

Yeo, et al., "Pricing for Utility-driven Resource Management and Allocation in Clusters", In International Journal of High Performance Computing Applications, vol. 21, Issue 4, Nov. 2007, 12 pages.

Garg, et al. "Faster and Simpler Algorithms for Multicommodity Flow and other Fractional Packing Problems", In Proceedings of the 39th Annual Symposium on Foundations of Computer Science, Nov. 8, 1998, 10 pages.

"International Search Report & Written Opinion Received for PCT Application No. PCT/US2015/019808", dated Sep. 18, 2015, 12 Pages.

"Response to the International Search Report & Written Opinion Received for PCT Application No. PCT/US2015/019808", Filed Date: Dec. 30, 2015, 4 Pages.

"Written Opinion of the International Preliminary Examining Authority for PCT Application No. PCT/US2015/019808", dated Feb. 8, 2016, 5 Pages.

"International Preliminary Report on Patentability Issued in PCT Application No. PCT/US2015/019808", dated May 11, 2016, 10 Pages.

"Response to the Office Action Issued in European Patent Application No. 15712477.7", Filed Date: Jan. 18, 2017, 14 Pages.

"Office Action Issued in Chilean Patent Application No. 2225-2016", dated Mar. 15, 2018, 10 Pages.

"Office Action Issued in Colombian Patent Application No. NC2016/0001697", dated Feb. 13, 2018, 10 Pages. (W/o English Translation).

(56) References Cited

OTHER PUBLICATIONS

"Search Report and Written Opinion Issued in Singapore Patent Application No. 11201607426X", dated Sep. 18, 2017, 9 Pages.

* cited by examiner

COMPUTING LONG-TERM SCHEDULES FOR DATA TRANSFERS OVER A WIDE AREA NETWORK

BACKGROUND

Wide area networks (WANs) are becoming ubiquitous, and relatively large volumes of data are often transferred between computing devices in WANs. To support the transfer of large volumes of data, operators of respective WANs invest a substantial amount of resources into computer networking hardware that facilitates data transfer between computing devices in WANs. Maximizing the utilization of such computer networking hardware in a WAN, therefore, is desirable from an efficiency standpoint.

Unfortunately, requestors of data transfers in a WAN, which generate network data traffic, are typically unaware of one another. Thus, a requestor of a data transfer sets forth a request with an expectation that the WAN can handle the request, and the data transfer will be immediately initialized. While this is not largely problematic for relatively small volumes of network traffic, when data transfers involving relatively large volumes of data overlap in time, the WAN may be excessively taxed. Such overlapping transfers can occur even if one or more requestors have the option of delaying their transfers to another time, since mechanisms are not provided by which such data transfers can be time-shifted. Consequently, not only can this inflexibility result in periods of excessive network taxation, it can also result in other time periods during which hardware resources of the WAN are underutilized, as there is a relatively small amount of network traffic. Accordingly, operators of WANs are often forced to purchase costly computer networking hardware to accommodate high-demand time periods, when large volumes of data are transferred over the WAN. This typically results in the WAN being over-provisioned, such that such costly computer networking hardware remains underutilized for substantial portions of its service life.

SUMMARY

The following is a brief summary of subject matter that is described in greater detail herein. This summary is not intended to be limiting as to the scope of the claims.

Described herein are various technologies pertaining to the schedule of data transfers in a network, such as a wide area network (WAN), based upon a plurality of requests for the data transfers, where the requests have respective deadlines, and where the data transfers are to be completed prior to the respective deadlines. In an exemplary embodiment, the network can comprise a plurality of data centers (each comprising a plurality of computing devices), and a request to transfer data can be a request to transfer data from a computing device in a first data center to a computing device in a second data center. The data centers in the network can be included in a public cloud or a private cloud. A public cloud exposes resources of the data centers (e.g., applications and storage) to the general public by way of the Internet. In contrast, a private cloud exposes resources of the data centers to a private enterprise that operates the data centers.

Further, the network comprises a plurality of devices that facilitate transfer of data between devices in the network. The plurality of devices include a plurality of computing devices that are configured to store and process data, where the plurality of computing devices reside on the edge of the network. For instance, the plurality of computing devices can include server computing devices in data centers. Additionally, the plurality of devices comprise network infrastructure devices (e.g., switches, routers, hubs, gateways, etc.) that are configured to direct the transfer of data among and between computing devices in the plurality of computing devices.

The network also includes a controller computing device that is configured to schedule data transfers over the network. For example, the controller computing device can receive a plurality of requests to transfer data between respective computing devices in the network, wherein each request can identify: 1) a respective source computing device (e.g., from where data is to be transferred; 2) a respective recipient computing device (e.g., to which the data is to be transferred; 3) a respective amount of data that is to be transferred from the source computing device to the recipient computing device; and 4) a respective deadline, wherein the transfer of data from the source computing device to the recipient computing device is to be completed prior to the deadline. The controller computing device can receive these requests at arbitrary times, and the requests can specify different amounts of data and different deadlines. For example, a first data transfer request can be received at a first point in time, and can indicate that the transfer of data is relatively urgent by specifying a deadline that is proximate in time to the first point in time. A second data transfer request can be received at a second point in time (where the first point in time and the second point in time are proximate), and indicate that the transfer of data is not particularly time-sensitive by specifying a deadline that is relatively distal from the second point in time.

The controller computing device receives such requests and computes a long-term schedule for the transfer of data in the network. The long-term schedule can cover a plurality of (potentially uniform) time units, where flow of data through the network is defined in the long-term schedule for each time unit covered by the long-term schedule. Thus, the long-term schedule comprises a sub-schedule for each time unit covered by the long-term schedule. In a non-limiting example, the long-term schedule can cover twelve 5-minute intervals, where the time-units are the 5-minute intervals. For each of these time units in the long-term schedule, the long-term schedule can include a respective sub-schedule. A sub-schedule can identify which computing devices are to act as source computing devices for the time unit of the sub-schedule, respective rates at which the computing devices are to output data, respective paths over which data is to travel between source computing devices and recipient computing devices, etc. It can therefore be ascertained that the controller computing device computes the long-term schedule to facilitate completion of requested data transfers prior to their respective deadlines while maximizing utilization of network resources. To that end, in an example, the controller computing device can determine whether to accept or decline newly received data transfer requests based upon the long-term schedule (e.g., the controller computing device can determine if a requested data transfer can be completed prior to its specified deadline based upon the long-term schedule, previously received requests where their data transfers have not been completed, and their respective deadlines). The controller computing device re-computes the long-term schedule over time to take into consideration newly received requests, alterations in the network, satisfied requests (where the respective data transfers have been completed), etc. In an exemplary embodiment, the controller computing device can compute the long-term schedule by executing an optimization process.

For instance, the optimization process can include execution of a mixed packing and covering algorithm.

The controller computing device can further compute a short-term schedule based upon the long-term schedule. The short-term schedule can cover fewer time units than the long-term schedule. For example, the short-term schedule can cover a single time unit that is immediately subsequent in time to a current time unit (e.g., a 5-minute interval). The short-term schedule includes: 1) routing tables for respective network infrastructure devices in the network; and 2) instructions for source computing devices that identifies data to be output by the source computing devices and respective rates at which the data is to be output by the source computing devices. The controller computing device computes the short-term schedule to facilitate completion of data transfers in accordance with the long-term schedule. The controller computing device transmits the routing tables and instructions in the short-term schedule to the respective network infrastructure devices and source computing devices in the network.

In the exemplary embodiment where the network supports data transfers between computing devices exposed in a public cloud, the controller computing device can compute a pricing schedule that is exposed to customers of the operator of the public cloud. The controller computing device can compute the price schedule to smooth demand over time, thereby facilitating maximization of utilization of network resources of the network. For example, the pricing schedule can indicate that requests with less urgent demands are associated with smaller fees per data unit transferred when compared to requests with more urgent demands. In another example, the pricing schedule can indicate that data transfers with associated deadlines within a particular time period are generally charged more per unit of data transferred when compared to data transfers with associated deadlines within other time periods (that are associated with less demand than the particular time period). Still further, prices for data transfers can be based upon source and/or destination computing device(s).

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
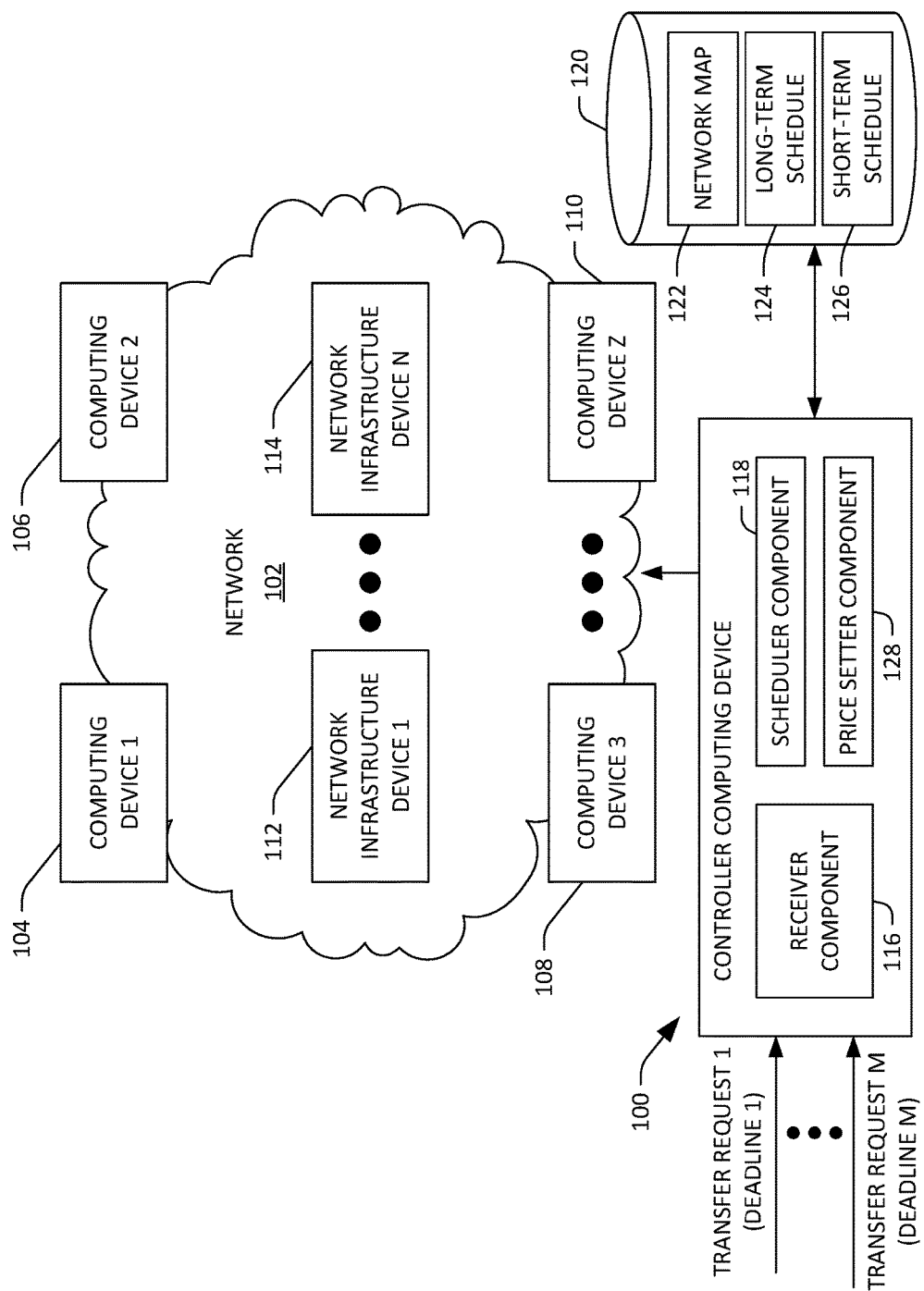
FIG. 1 is a functional block diagram of an exemplary system that facilitates scheduling data transfers among and between computing devices in a network.

Various technologies pertaining to transferring data between computing devices in a network (such as a wide area network (WAN)) are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by a single system component may be performed by multiple components. Similarly, for instance, a single component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

With reference now to FIG. 1, an exemplary controller computing device 100 that is configured to compute a long-term schedule for data transfers in a network 102 is illustrated. For example, the network 102 can be a WAN. While the controller computing device 100 is shown as being external to the network, it is to be understood that this is for purposes of illustration, and that the controller computing device 100 is included in the network 102. Further, while the controller computing device 100 is shown and described as being a single computing device, the controller computing device 100 is to encompass a logically centralized control system, wherein functionality described as being performed by the controller computing device 100 may be distributed across several computing devices.

The network 102 includes a plurality of computing devices 104-110 that reside on the edge of the network 102. In an exemplary embodiment, a number of computing devices in the plurality of computing device 104-110 can be between ten computing devices and 3000 computing devices. In another exemplary embodiment, a number of computing devices in the plurality of computing devices 104-110 can be between ten computing devices and 100,000 computing devices. In an exemplary embodiment, the computing devices 104-110 can be server computing devices residing in respective server racks. Furthermore, the computing devices 104-110, in an example, may be at respective different data centers, wherein each data center comprises a respective plurality of computing devices in communication with one another. The data centers can be employed to facilitate provision of a public and/or private cloud. A public cloud exposes resources of the data centers to the public (e.g., for fees) by way of the Internet, while a private cloud exposes resources of the data centers to an enterprise that operates the data centers. The network 102 further comprises a plurality of network infrastructure devices 112-114 that facilitate transfer of data among and between the computing devices 104-110. For example, the network infrastructure devices 112-114 can be or include switches, routers, hubs, gateways, or the like. Pursuant to an example, a number of network infrastructure devices in the plurality of network infrastructure devices can be between 10 devices and 1000 devices. In another example, a number of network infrastructure devices in the plurality of network infrastructure devices can be between 100 devices and 10000 devices.

In an example, an owner of data retained on one of the computing devices 104-110 may desirably transfer such data to another of the computing devices 104-110. Conventionally, for instance, when a request is received to transfer data from the first computing device 104 to the third computing device 108, very little scheduling is involved. Instead, the first computing device 104 begins to transmit data at as high of a rate as possible, and the data travels along one or more paths through the network 102 to the third computing device 108, potentially taxing the infrastructure of the network 102. Specifically, the network infrastructure devices 112-114 are typically configured with instructions to balance the load transmitted across network links when directing data along to the intended recipient (the third computing device 108). This approach is workable for over-provisioned networks, where an operator of the WAN 102 provides sufficient network capacity to meet maximal data transfer demand. This, however, tends to be an inefficient use of the resources of the network 102.

The controller computing device 100, as will be described in greater detail below, computes a long-term schedule for data transfers over the network 102, which can result in smoothing the volume of traffic over the network 102 over time, thus increasing efficiency of utilization of the network 102. To that end, the controller computing device 100, in contrast to conventional approaches, contemplates transfer deadlines (received at different times and having different durations) when computing the long-term schedule (plan) for data transfers in the network 102.

With more detail pertaining to computation of a long-term schedule, the controller computing device 100 includes a receiver component 116 that can receive a plurality of data transfer requests. For instance, the network 102 can be configured to simultaneously support 100,000 separate traffic flows (e.g., transfers of data between computing devices in the computing devices 104-110). The data transfer requests received by the receiver component 116 include respective identities of sources of data to be transmitted, respective identities of intended recipients of data to be transmitted, respective volumes of data to be transmitted over the WAN 102, and respective deadlines. More particularly, a data transfer request received by the receiver component 116 includes: 1) an identity of a source computing device from which data is to be transferred; 2) an indication of the data that is to be transferred; 3) an identity of a recipient computing device that is to receive the data that is to be transferred; 4) a volume of the data that is to be transferred from the source computing device to the recipient computing device; and 5) a deadline, wherein the volume of data is to be transferred from the source computing device to the recipient computing device prior to the deadline. Further, it is to be understood that the request can include multiple potential deadlines, where fees for the transfer vary depending upon the deadline. The receiver component 116 can receive the data transfer request from the source computing device, from the recipient computing device, or from another computing device operated by an owner of the data that is to be transferred from the source computing device to the recipient computing device. The data transfer requests can be received from any of the devices in the computing devices 104-110, or can be received from a system or component that identifies server(s) from which data is to be transferred. In an example, the system or component referenced above need not identify particular source and target computing devices in the request; thus, the request can be more general, requesting information about paths in the network, transfer rates, etc.

In a non-limiting example, the receiver component 116 can receive a first data transfer request, wherein the first data transfer request identifies the first computing device 104 as the source computing device, identifies data to be transferred, identifies the third computing device 108 as the recipient computing device, identifies that the volume of the data is 50 terabytes, and identifies that such transfer is to be completed prior to 4:00 pm of the date of the data transfer request. Similarly, the receiver component 116 can receive an Mth data transfer request, wherein the Mth data transfer request identifies the second computing device 106 as being the source computing device, identifies the data to be transferred, identifies the first computing device 104 as being the recipient computing device, identifies that the volume of the data is 5 petabytes, and identifies that such transfer is to be completed by 5:00 am the next day.

The controller computing device 100 additionally comprises a scheduler component 118 that is in communication with the receiver component 116. The controller computing device 100 has access to a data store 120, wherein the data store 120 includes a network map 122. The network map 122 represents the physical topography of the network 102. For example, the network map 122 may be a computer-implemented graph that is representative of the network 102, wherein the graph includes nodes that are representative of the devices (e.g., the computing devices 104-110 and the network infrastructure devices 112-114) in the network 102 and edges that represent communications links between respective devices. The network map 122 can further include data that identifies constraints of the network 102, such as capacities of respective links of the network 102. In an exemplary embodiment, the network map 122 can be updated from time to time based upon data received from devices of the network 102. For example, data can be received from a device in the network 102 that indicates that a particular link is down. In another example, data can be received from a device in the network 102 that indicates that a particular link has been restored. The network map 122 can be updated from time to time to reflect these changes in topology of the network 102.

The scheduler component 118 receives the plurality of data transfer requests (over time) and the network map 122 from the data repository 120, computes a long-term schedule 124 for data transfers in the network 102 based upon the data transfer requests and the network map 122, and stores the long-term schedule 124 in the data repository 120. Additionally, while not shown, the scheduler component 118 can compute the long-term schedule based upon historic network utilization. For example, if a customer historically requests transfer of data every day at a particular time, the scheduler component 118 can reserve network resources for the customer in the long-term schedule, even if the receiver component 116 has yet to receive a data transfer request from the customer. Still further, the scheduler component 118 can reserve network resources for ad-hoc requests when computing the long-term schedule, where ad-hoc requests are typically those that have no specified deadline and request a relatively small volume of data to be transferred over the network 102. In an example, and as will be described in greater detail below, the scheduler component 118 can execute an optimization process when computing the long-term schedule 124, wherein the optimization process can include execution of a mixed packing and covering algorithm.

Additional detail pertaining to the long-term schedule 124 is now set forth. The long-term schedule 124 covers a plurality of time units going forward in time (e.g., future time units). In an exemplary embodiment, the time units covered by the long-term schedule 124 can be uniform, such that the time units have a common duration. In another exemplary embodiment, the time units covered by the long-term schedule may be non-uniform, wherein duration of a time unit covered by the long-term schedule 124 proximate in time to the current time is shorter when compared to a time unit covered by the long-term schedule that is distal in time from the current time. Pursuant to an example, the long-term schedule 124 can cover 240 consecutive one-minute time windows (e.g., for a 4-hour total time window), wherein the time units covered by the long-term schedule 124 are one minute windows. The long-term schedule 124 includes a respective sub-schedule for each time unit covered by the long-term schedule 124, wherein a sub-schedule defines flow of data through the network 102 during its time unit.

For instance, the sub-schedule can identify which computing devices in the computing devices 104-110 are source computing devices, which computing devices in the computing devices 104-110 are recipient computing devices (where a computing device can be both a source computing device and a recipient computing device), rates at which respective source computing devices are to output data, and paths over which data is to be transferred from source computing devices to recipient computing devices. The scheduler component 118 re-computes the long-term schedule 124 as time passes, such that the long-term schedule covers a time window of a particular duration as time moves forward. Re-computation of the long-term schedule further allows for new data transfer requests (ad-hoc or with specified deadlines) to be contemplated, changes in topology of the network 102 to be contemplated, completed requests to be contemplated, etc. An exemplary process for performing this computation of the long-term schedule 124 is set forth below.

The scheduler component 118 can compute a short-term schedule 126 based upon the long-term schedule 124 and can store the short-term schedule 126 in the data repository 120. The short-term schedule 126 defines flow of data through the network 102 during a time unit that is immediately subsequent to the current time unit (e.g., the next one minute time window). Accordingly, the short-term schedule 126 covers fewer time units than the long-term schedule 124. In an exemplary embodiment, the short-term schedule 126 can cover a single time unit. The short-term schedule 126 includes: 1) routing tables for the network infrastructure devices 112-114, respectively; and instructions for source computing devices in the computing devices 104-110 as to whether to output particular data during the time covered by the short-term schedule 126 and a rate at which to output the particular data. The controller computing device 100 can transmit the respective routing tables to the network infrastructure devices 112-114 and can transmit the respective instructions to one or more of the computing devices 104-110.

It can therefore be ascertained that the scheduler component 118 computes the long-term schedule 124 and the short-term schedule 126 to facilitate completion of requested data transfers corresponding to accepted data transfer requests prior to their respective deadlines. In another example, where completion of data transfers is not possible, the scheduler component 118 can compute the long-term schedule 124 to minimize loss of revenue, to allow a percentage of requests to be satisfied (e.g., 95% of all requests to be satisfied), or the like. Additionally, as noted above, the scheduler component 118 can determine whether to accept or reject a received data transfer request based upon the long-term schedule 124. Pursuant to an example, the long-term schedule 124 can indicate that, for a particular time window, a certain link in the network 102 is scheduled to transmit data at maximum capacity. Based upon this information, the scheduler component 118 can output an indication to the requester that the data transfer request is unable to be completed prior to the deadline (as the link does not support the increased capacity caused by the data transfer request). The scheduler component 118 can additionally perform other analysis when scheduling data transfers. For instance, when operating in a public cloud, the scheduler component 118 can be configured to determine whether to accept or reject received requests to maximize profit, minimize loss, etc.

The controller computing device 100 may additionally include a price setter component 128 that can expose a pricing schedule to customers based upon the long-term schedule 124. For instance, when at least one of the computing devices 104-110 is included in a data center that exposes resources by way of a public cloud, customers of the public cloud can pay fees for transfer of data. The price setter component 128 can set prices for data transfers as a function of (lengths of) deadlines in requests for data transfers, times when transfers are to be completed, etc. For example, the price setter component 128 can set a lower price per unit of data transferred when the deadline of a data transfer request is distal in time from a current time. The price setter component 128 can compute the price schedule to drive network utilization to a desired operating point. That is, the price setter component 128 can set prices to manipulate demand for data transfers in the network 102 based upon deadline-based data transfer requests. Initiators of data transfer requests may thus be incentivized to provide longer deadlines to achieve reduced cost. Moreover, the price setter component 128 can be configured to accept or reject price offers; for instance, a request can identify multiple deadlines, each deadline with a particular price (e.g., per unit to be transferred) related thereto. For example, the request can indicate that if the transfer is completed by a first time, the requestor is willing to pay a first price, if the transfer is completed by a second time, the requestor is willing to pay a second price, and so on. The price setter component 128 can act to select the price (and thus the deadline), and the long-term schedule can be computed based upon the actions of the price setter component 128.

Figure 2:
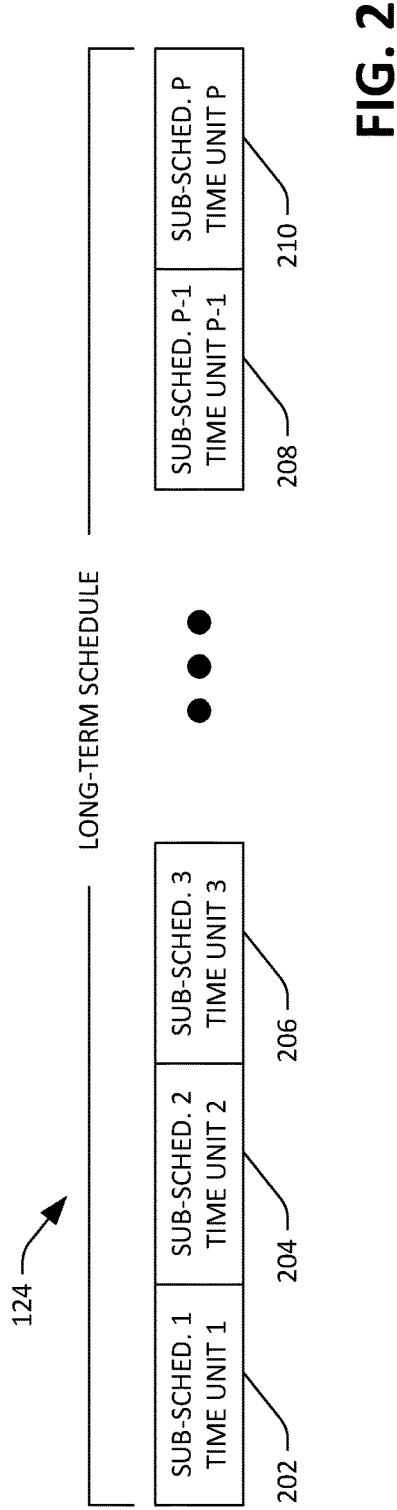
FIG. 2 is an exemplary long-term schedule for data transfers in the network.

Referring now to FIG. 2, an exemplary depiction of the long-term schedule 124 computed by the scheduler component 118 is shown. As can be ascertained, the long-term schedule 124 covers a plurality of time units (time unit 1-time unit P). Accordingly, the long-term schedule 124 can be perceived as comprising a plurality of sub-schedules 202-210, one sub-schedule for each time unit. Each sub-schedule in the sub-schedules 202-210 can define how data is to flow through the network 102 for its respective time unit. For example, the first sub-schedule 202 in the long-term schedule 124 can define how data is to flow through the network 102 for the first time unit (e.g., for the 5 minutes represented by the first time unit). Accordingly, the first sub-schedule 202 can define, for each data transfer between a source computing device and a recipient computing device (traffic flow), a rate at which the source is to output data and path(s) over which the output data is to travel to reach the recipient computing device. Therefore, the first sub-schedule 202 can configure (or specify) rate and path(s) of various traffic flows, each traffic flow having its own source and recipient computing device, and each traffic flow having path(s) defined over which the traffic flow is to travel from the source computing device to the recipient computing device. As indicated above, the time units 1-P may have a common duration, which, in an example, can be between 1 minute and 5 minutes. In another example, the time units 1-P may have different durations. For example, the first time unit may have a shorter duration than the duration of the Pth time unit. Pursuant to a particular example, the first time unit for the first sub-schedule 202 may have a time duration of 1 minute, while the Pth time unit for the Pth schedule 210 may have a time duration of 10 minutes.

Figure 3:
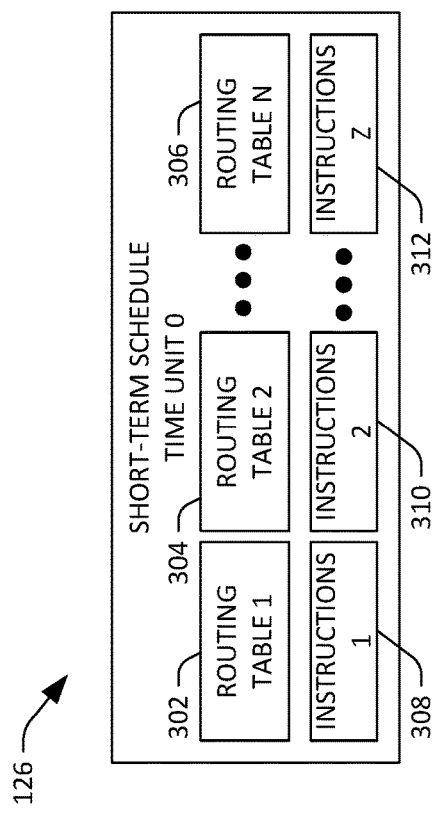
FIG. 3 is an exemplary short-term schedule for data transfers in the network.

Now referring to FIG. 3, an exemplary depiction of the short-term schedule 126 is illustrated. The short-term schedule 126 covers an immediately subsequent time unit (time unit 0). The short-term schedule 126 comprises a plurality of routing tables 302-306 that respectively correspond to the plurality of network infrastructure devices 112-114, and a plurality of instructions 308-312 that respectively correspond to the plurality of computing devices 104-110. The plurality of instructions 308-312 define which of the computing devices 104-110 is to begin outputting data to satisfy a data transfer request, and rate(s) at which computing device(s) are to output such data. The scheduler component 118 can transmit the routing tables 302-306 to the respective network infrastructure devices 112-114, and the scheduler component 118 can transmit the instructions 308-312 to the respective computing devices 104-110. Thus, the first routing table 302 is transmitted to the first network infrastructure device 112, and the Nth routing table 306 is transmitted to the Nth network infrastructure device 114. The first network infrastructure device 112, responsive to receiving the first routing table 302, is configured (for time unit 0) with the routing table 302, and routes data received by the network infrastructure device 112 in accordance with contents of the first routing table 302. Likewise, the first instructions 310 are transmitted to the first computing device 304, and the Zth instructions 312 are transmitted to the Zth computing device 110. Accordingly, in an example, the first computing device 104, responsive to receipt of the first instructions 310, outputs data in accordance with the first instructions 310.

Figure 4:
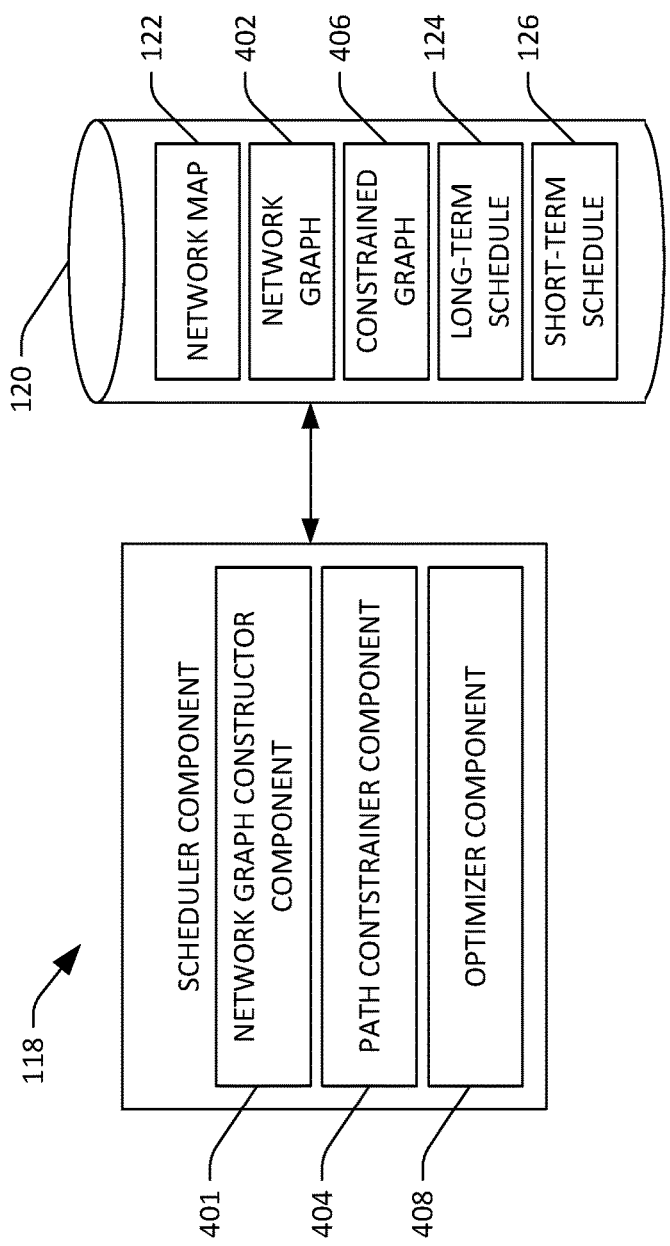
FIG. 4 is a functional block diagram of an exemplary scheduler component that can generate a long-term schedule and a short-term schedule for data transfers in the WAN.

With reference now to FIG. 4, a detailed depiction of the scheduler component 118 is presented. The scheduler component 118 can access the data repository 120 and retrieve the network map 122. The scheduler component 118 comprises a network graph constructor component 401 that receives the network map 122 and constructs a network graph 402 based upon the network map 122 and a number of time units covered by the long-term schedule 124 covers. The scheduler component 118 causes the network graph 402 to be retained in the data repository 120. When constructing the network graph 402, the network graph constructor component 401 can generate multiple instances of the network map 122: one instance for each time unit covered by the long-term schedule 124. The network graph constructor component 401 can couple different instances of the network map 122 by generating edges that couple nodes in the instances of the network map 122 that represent a same device.

Figure 5:
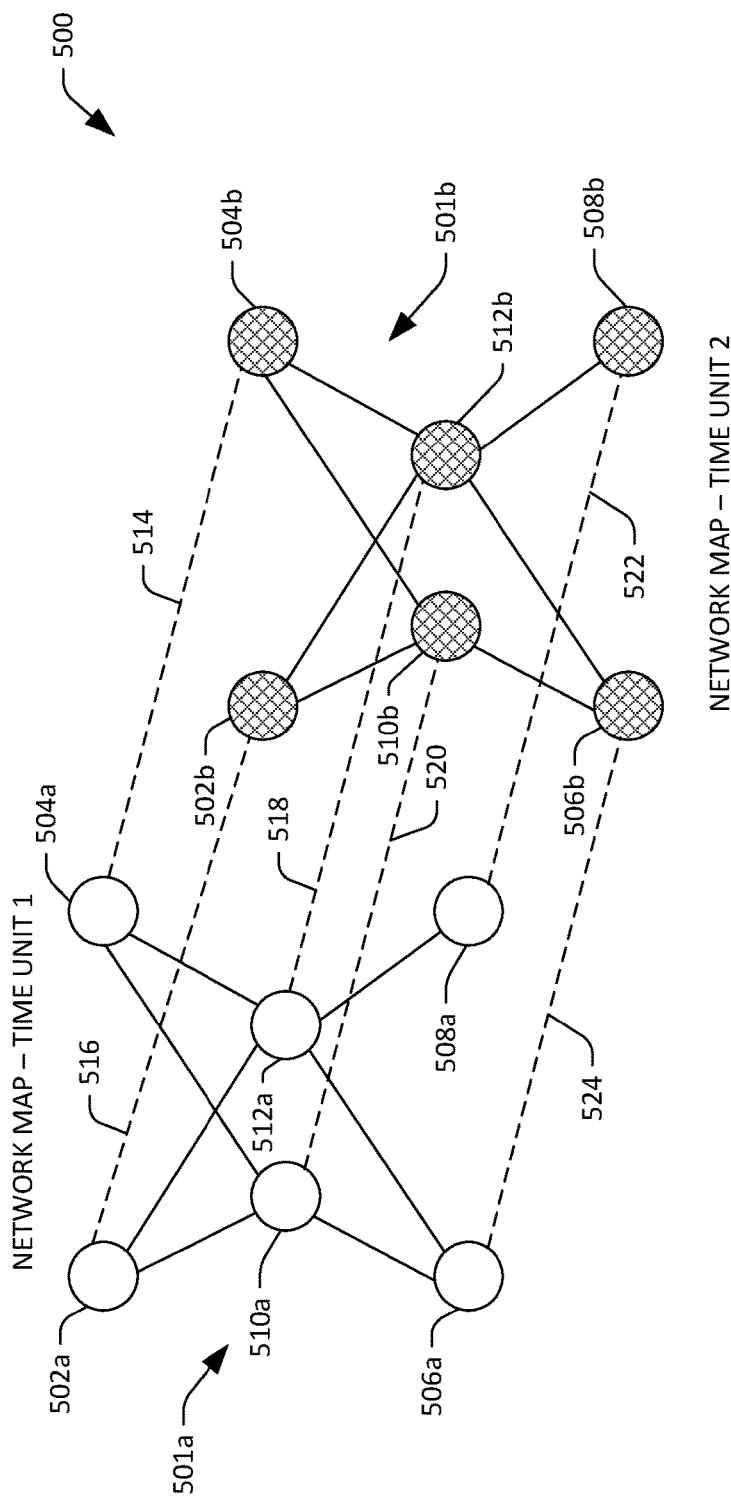
FIG. 5 is an exemplary network graph.

Referring briefly to FIG. 5, an exemplary network graph 500 that can be constructed by the network graph constructor component 401 is illustrated. The exemplary network graph 500 comprises a first instance of the network map 501a for a first time unit and a second instance of the network map 501b for a second time unit. The first instance 501a of the network map 122 comprises a first plurality of nodes 502a-508a that are respectively representative of the computing devices 104-110 of the network 102 and a second plurality of nodes 510a-512a that are respectively representative of the network infrastructure devices 112-114. The first instance 501a of the network map 122 includes edges (shown in solid line) that represent physical links between devices in the network 102. The second instance 501b of the network map 122 additionally includes such edges. In an example, edges can be weighted differently in the instances of the network map 122. For example, it may be desirable to reserve more bandwidth over a particular link in the network 102 for the first time unit when compared to the second time unit. This can be represented in the network graph 500 through assignment of different weights to the link in the first instance 501a of the network map 122 and the second instance 501b of the network map 122.

The network graph 402 also includes a plurality of edges 514-524 that couple nodes between the instances 501a and 501b of the network map 122 that represent same devices. For example, a first edge 514 couples the node 504a with the node 504b, wherein both 504a and 504b represent the second computing device 106. Similarly, a second edge 516 couples the node 502a to the node 502b, wherein both nodes 502a and 502b represent the first computing device 104 in the network 102. In an exemplary embodiment, relatively high weights can be assigned to the edges 514-524. Accordingly, the network 102 can be represented at numerous different time units by the network graph 402. The edges shown in solid can be weighted based upon, for example, capacity of the physical network links represented by such edges, historic demands of the physical links during the time units, some combination thereof, or the like. While not shown, if the network graph 500 included a third instance of the network map 122 corresponding to a third time unit, each node in the third instance of the WAN map 122 would be coupled to all nodes in the network graph 500 that represent the same device.

Returning to FIG. 4, the scheduler component 118 may further include a path constrainer component 404 that receives the network graph 402 and applies path-based constraints to the network graph 402. For example, to reduce computation complexity, the path constrainer component 404 can constrain a number of potential paths between a source and destination to some threshold number of paths, can constrain paths based upon a number of network hops between a source computing device and destination computing device (e.g., network paths having more than a threshold number of hops between a source and destination are not considered when determining paths between the source and the recipient), or other suitable constraint. Responsive to applying constraints to the network graph 402, the scheduler component 118 can store a constrained graph 406 in the data repository 120.

The scheduler component 118 can further include an optimizer component 408 that receives the constrained graph 406 and data relating to all pending data transfer requests (e.g., previously received and accepted data transfer requests, where their respective data transfers are incomplete), and outputs the long-term schedule 124 based upon the pending data transfer requests, their respective statuses (e.g., amounts of data to be transferred, amounts of time prior to the respective deadlines of the requests, etc.), and the constrained graph 406. As indicated above, the optimizer component 408 can execute a suitable optimization process to compute the long-term schedule. In an exemplary embodiment, the optimization process can include execution of a mixed packing and covering algorithm, wherein the optimizer component 408 computes the long-term schedule 124 to (for instance) smooth network utilization over time and meet the deadlines of the requests. In an exemplary embodiment, the optimizer component 408 can execute a parallelized version of a mixed packing and covering algorithm. Parallelization may be necessary to allow for repeated computation of the long-term schedule 124 over time as circumstances change. Other types of optimization approaches, including expectation-maximization approaches, linear programming processes, and the like can be used to generate the long-term schedule 124. The optimizer component 408 can generate the short-term schedule 126 based upon the long-term schedule 124.

Additional detail pertaining to an exemplary optimization process that can be executed by the optimizer component 408 is now set forth. Generally, the optimizer component 408 receives a computer-implemented graph G=(V,E), where $|V|=n$ and $|E|=m$, and non-negative edge capacities $c: E \rightarrow R_+$. Long-term requests can be defined by the tuple $(a_i, b_i, d_i, D_i, s_i, t_i, \mathcal{P}_i)$, where $a_i$ is the aware time in which the optimizer component 408 becomes aware of the request, $b_i$ is the begin time from which the request can be scheduled, $d_i$ is the deadline after which the request cannot be scheduled, $D_i$ is the demand of the request, $s_i$ is the source node the request needs to be routed from, $t_i$ is the target node the request needs to be routed to, and $\mathcal{P}_i$ is the collection of admissible paths from $s_i$ to $t_i$ of the request.

When time step $\tau$ begins, the optimizer component 408 becomes aware of all long-term requests i for which $a_i = \tau$. Additionally, the optimizer component 408 can have an estimate $X_{e,\tau}$ for the fraction of the capacity $c_e$ of edge e that may be needed by high priority (e.g., ad-hoc) requests at time $\tau$. Since $X_{e,\tau}$ is an estimate, the actual fraction of the capacity needed to service the ad-hoc requests becomes known at the beginning of time $\tau$ (along with long-term requests made at such time).

As indicated above, the optimizer component 408 can treat the scheduling problem as a mixed packing and covering problem, and can thus use packing and covering constraints to generate the schedule. For example, the optimizer component 408 can use variables $f_{i,p,\tau}$ corresponding to the amount of flow allocated for request i on path $p \in \mathcal{P}_i$ in time $\tau$, where $b_i \leq \tau \leq d_i$. Using these variables, linear packing and covering inequalities can be formulated that assert the allocation's feasibility; in every time and for every edge the total flow allocated on it does not exceed its capacity; each long-term request i is allocated at least a fraction $\alpha_i$ of its demand $D_i$ until its deadline.

These inequalities evolve and change over time for several reasons: new long-term requests arrive; the stochastic realization of high-priority usage of edges (e.g., to service ad-hoc requests) is revealed; and under-allocation of edges in the far future diminishes as time progresses. The optimizer component 408 adjusts the variables $f_{i,p,\tau}$ in response to changing inequalities, thereby adapting the schedule. It is to be noted that this approach improves upon schemes that only compute schedules for the current time instance, as the optimizer component 408 schedules flows relatively far into the future, enabling the output of a promised $\alpha_i$ on the fraction of the demand the ith request receives.

Further, as indicated, the optimizer component 408 can correct for high-priority (ad-hoc) data transfer requests. $X_{e,\tau}$ is an estimate of the fraction of the capacity of edge e needed by high priority requests at time $\tau$. Thus, when formulating the above inequalities, instead of using the capacity $c_e$ at time $\tau$, the optimizer component 408 can use $(1-X_{e,\tau}) \cdot c_e$. Once time $\tau$ has been reached and the realization of such fraction is observed, the optimizer component 408 may find that edge e is overused—e.g., the total flow on e exceeds its capacity. When this occurs, the optimizer component 408 can reduce some pre-scheduled flows $f_{i,p,\tau}$ for which $e \in p$. This can be done by formulating a small linear program (whose size depends only on the size of the original computer-implemented graph G and not $\tau$) as to minimize the effect on the promises $\alpha_i$ output by the optimizer component 408.

Further, the optimizer component 408 can be configured to under-utilize edges that are far into the future (e.g., constrain the graph G), and diminish this restriction as time progresses. For example, a parameter $\beta_{e,t,\tau}$ can be used to determine the fraction of $(1-X_{e,\tau}) \cdot c_e$ that can be utilized by the optimizer component 408 at time $\tau$. As time $\tau$, progresses, $\beta_{e,t,\tau}$ can increase (e.g., the under-utilization restriction diminishes).

In an exemplary embodiment, the optimizer component 408 can be configured to maximize the worst promise $\alpha$, which corresponds to a "fairness" objective. In spite of maximizing $\alpha$, some portions of the network 102 may be under-utilized, and more flow can be allocated. To address this issue, the optimizer component 408 can employ a secondary utility function; e.g., maximize the average promise $\delta$, which leads to a schedule having higher network utilization. This utility can be formulated as a covering inequality.

It can be ascertained that long-term requests that are extremely lengthy, e.g., $d_i - a_i$ is very large, can slow the running time of the optimizer component 408. In order to facilitate computing a solution relatively quickly, the optimizer component 408 can employ a sliding window approach, where the optimizer component 408 considers a fixed number of time steps into the future. Requests whose respective deadlines lie beyond the sliding window can be broken into smaller requests. In such case, the optimizer component 408 can update a smaller request's demand based on its original demand and the total flow already allocated.

Additional detail pertaining to the design and operation of the optimizer component 408 are now set forth. For purposes of explanation, processes are derived in stages, starting from the offline case, proceeding to the online case, and then adding additional features such as traffic smoothening by way of the β parameters, grace or violation of capacity constraints, request splitting due to bounded horizon, and handling of different priorities. Furthermore, while the examples provided herein refer to computing traffic flow schedules in network, it is to be understood that the mixed packing and covering approach described herein can be used in other scenarios. For example, dynamic modification of inequalities as data is received to output a solution is contemplated. In addition, parallelization of mixed packing and covering algorithms are generally contemplated, and doing so to compute a long-term schedule for network traffic flows is but one exemplary scenario where it may be desirable to parallelize a mixed packing and covering algorithm. Still further, the general approach of estimating high priority traffic in a network and allocating remaining bandwidth of network links to meet a goal is contemplated. In such a case, the allocating of the bandwidth of the links can be dynamically updated when the actual high priority traffic differs from the estimate, while minimal disruption to the goal occurs.

As indicated above, $G=(V,E)$, where $|V|=n$ and $|E|=m$, and non-negative edge capacities $c: E \to R_+$. Long-term requests can be defined by the tuple $(a_i, b_i, d_i, D_i, s_i, t_i, \mathcal{P}_i)$. Additionally, unless otherwise specified, it can be assumed that there is an absolute size T (which may be large) that upper bounds requests' respective deadlines, e.g., $T \geq d_i \forall 1 \leq i \leq k$.

The optimizer component 408 in the offline case is now described, where it is assumed that the optimizer component 408 is aware of all requests from the beginning, e.g., that $a_i=0$ for all requests $1 \leq i \leq k$. Given the graph G and all k requests, it can be desirable to locate the largest $\alpha$, $0 \leq \alpha \leq 1$, such that a fraction of at least $\alpha$ of the demand of each request can be routed while respecting capacity constraints. This is referred to as the "concurrent multicommodity flow" problem, a special case of the problem of fractionally solving a system of linear packing/covering constraints. Given $\alpha$, the system of linear inequalities needed to solve the offline case (with no utility) by a linear program is as follows:

$\Sigma_{i: b_i \leq t \leq d_i} \Sigma_{p \in \mathcal{P}_i: e \in p} f_{i,p,t} \leq c_e \ \forall e \in E, \forall 0 \leq t \leq T$ $\Sigma_{t=b_i}^{d_i} \Sigma_{p \in \mathcal{P}_i} f_{i,p,t} \geq \alpha \cdot D_i \ \forall 1 \leq i \leq k$ $f_{i,p,t} \geq 0 \ \forall 1 \leq i \leq k, \forall p \in \mathcal{P}_i, \forall 0 \leq t \leq T$ In the example set forth above, the optimization process searches iteratively for the best $\alpha$ (e.g., using line search methods). In each iteration, it is ascertained whether the linear program is feasible or not; if feasible, a feasible solution can be output. An exemplary process for solving the feasibility problem is presented below.

Initialization $\begin{cases} f_{i,p,t} \leftarrow 0 & \forall 1 \leq i \leq k, \forall p \in \mathcal{P}_i, \forall b_i \leq t \leq d_i \\ y_{e,t} \leftarrow 1 & \forall e \in E, \forall 0 \leq t \leq T \\ z_i \leftarrow 1 & \forall 1 \leq i \leq k \\ R \leftarrow \{1, \ldots, k\} \end{cases}$ while $\exists i \in R$ s.t. $\sum_{t=b_i}^{d_i} \sum_{p \in \mathcal{P}_i} f_{i,p,t} < \alpha \cdot D_i$ do -continued Find $i^* \in R$, $b_i^* \leq t^* \leq d_i^*$, and $p^* \in \mathcal{P}_i^*$ s.t.:

$$\frac{\sum_{e \in p^*} \frac{y_{e,t^*}}{c_e}}{\sum_{e \in E} \sum_{t=0}^{T} y_{e,t}} \leq \frac{\frac{1}{\alpha \cdot D_{i^*}} \cdot z_{i^*}}{\sum_{i \in R} z_i} \quad (*)$$

if there is no such $i^*, t^*$, and $p^*$, then abort and return that there is no feasible solution else $\gamma \leftarrow \varepsilon \cdot \min\{\alpha \cdot D_{i^*}, \min_{e \in p^*}\{c_e\}\}$;

$f_{i^*, p^*, t^*} \leftarrow f_{i^*, p^*, t^*} + \frac{\varepsilon}{N} \cdot \gamma$;

$y_{e,t^*} \leftarrow y_{e,t^*} \cdot e^{\frac{\gamma}{c_e}}, \forall e \in p^*$;

$z_{i^*} \leftarrow z_{i^*} \cdot e^{-\frac{\gamma}{\alpha \cdot D_{i^*}}}$;

if $\sum_{t=b_{i^*}}^{d_{i^*}} \sum_{p \in \mathcal{P}_{i^*}} f_{i^*, p, t} \geq \alpha \cdot D_i^*$ then $R \leftarrow R \setminus \{i^*\}$;

return $\{f_{i,p,t}: 1 \leq i \leq k, p \in \mathcal{P}_i, b_i \leq t \leq d_i\}$ The initialization referred to above and the update of the $y_{e,t}$s and $z_i$s is done so that the following holds:

$$y_{e,t} = \exp\left(\frac{N}{\varepsilon \cdot c_e} \sum_{i: b_i \leq t \leq d_i} \sum_{p \in \mathcal{P}_i: e \in p} f_{i,p,t}\right) \quad (1)$$

$$z_i = \exp\left(-\frac{N}{\varepsilon \cdot \alpha \cdot D_i} \sum_{t=b_i}^{d_i} \sum_{p \in \mathcal{P}_i} f_{i,p,t}\right) \quad (2)$$

In each step of the process, a single (carefully chosen) flow variable $f_{i^*, p^*, t^*}$ is increased. The variable can be chosen for which the increase in the "worst" packing constraint (e.g., a link in the network 102 whose capacity is closest to being violated) would be less than the increase in the "worst" covering constraint (e.g., the request which is the furthest from its demand constraint). Existing processes pertaining to packing and covering problems can satisfy this requirement through use of a smooth approximations of max and min operators; the approximate requirement is manifested in inequality (*), where the $y_{e,t}$s can be viewed as internal variables representing the packing constraints, while the $z_i$ as internal variables representing the covering constraints.

The output of an existing packing and covering algorithm guarantees that the covering constraints are satisfied (assuming that $\alpha$ is feasible). Because (*) is the ratio of the derivatives of the smooth approximations of max and min (as opposed to the ratio of the changes in the value of the constraints), the output violates the packing constraints by a small multiplicative factor. The factor monotonously decreases to one as the accuracy parameter $\epsilon$ is decreased to zero. Such guarantee is made formal in the following theorem.

Theorem 1:

If the linear program is feasible, then for every $0 < \varepsilon \leq \frac{1}{2}$, the output of the process satisfies:

$\Sigma_{i: b_i \leq t \leq d_i} \Sigma_{p \in \mathcal{P}_i: e \in p} f_{i,p,t} \leq (1+3\varepsilon) \cdot c_e \ \forall e \in E, \forall 0 \leq t \leq T$ $\Sigma_{t=b_i}^{d_i} \Sigma_{p \in \mathcal{P}_i} f_{i,p,t} = \alpha \cdot D_i \ \forall 1 \leq i \leq k$ Theorem 2:

For every $0<\varepsilon\leq\frac{1}{2}$, the feasibility-checking process terminates after at most $$k + \frac{N}{\varepsilon^2} \cdot (k + (1+3\varepsilon) \cdot m \cdot (T+1))$$

iterations.

The choice of ε reflects the required tradeoff between the accuracy of the process (by how much the packing constraints are deviated) and running time. A small violation in capacity constraints may be acceptable when concepts of traffic smoothening by way of the β parameters, as the violation means that only a pre-specified fraction of the capacity $c_e$ is exceeded, rather than the entire capacity.

As can be ascertained, maximizing α corresponds to a fairness objective, where it is guaranteed that a fraction of α from each request's demand is routed by its deadline. This alone may be insufficient, as it is possible that a solution which achieves the best α may not utilize parts of the network and more flow can still be routed. Accordingly, one may use an additional utility function, e.g., the average α:

$$\frac{1}{k}\sum_{i=1}^{k} \alpha_i,$$

that needs to be maximized along all the optimal solutions of the original fairness objective (e.g., the above-mentioned maximization of the "worst" α).

Any utility of the following form can be introduced: $g(\vec{f})=\sum_{i=1}^{k}\sum_{p\in\mathcal{P}_i}\sum_{t=b_i}^{d_i}u_{i,p,t}\cdot f_{i,p,t}$, where $u_{i,p,t}\geq 0$. In particular, the above-mentioned average α utility can be achieved by choosing $$u_{i,p,t} = \frac{1}{k\cdot D_i}.$$

It can be noted that $g(\vec{f})$ can be used to model "soft deadlines." For example, a request i can be fixed, and the utility coefficients $u_{i,p,t}=h_i(t)$ can be considered for a function $h_i(t)$ that decays exponentially fast for t>D (D is some time step). This functions models the fact that D is a soft deadline for request i.

The following constraint can be added to the linear program referenced above: $g(\vec{f})\geq U$ for some guess U of g's maximum value. As a conventional packing and covering algorithm works for any packing and covering constraints, adding the above linear covering constraint is possible. Given the constraint, the following changes can be made to the process referenced above: an internal r variable is added; r is initialized to 1; when increasing $f_{i^*,p^*,t^*}$, r is updated as follows:

$$r \leftarrow r \cdot e^{-\frac{u_{i^*,p^*,t^*}\cdot \gamma}{F}};$$

condition (*) is changed to:

$$\sum_{e\in p^*}\frac{y_{e,t^*}}{c_e} \leq \frac{\frac{1}{\alpha\cdot D_{i^*}}\cdot z_{i^*} + \frac{u_{i^*,p^*,t^*}}{F}\cdot r}{\sum_{e\in E}\sum_{t=0}^{T}y_{e,t}};$$

when the new constraint is satisfied for the first time, i.e., $g(\vec{f})\geq F$, the internal variable r is removed from (*) and is not updated any longer; the stopping condition of the process is that all covering constraints (one for each request i and the additional utility constraint $g(\vec{f})\geq F$) are satisfied; γ is chosen by the following formula:

$$\gamma \leftarrow \varepsilon\cdot\min\left\{\alpha\cdot D_{i^*}\min_{e\in p^*}\{c_e\}, \frac{F}{u_{i^*,p^*,t^*}}\right\}.$$

The variable r is initialized as above so that the following holds:

$$r = \exp\left(\frac{N}{\varepsilon\cdot F}\sum_{i=1}^{k}\sum_{p\in\mathcal{P}_i}\sum_{t=b_i}^{d_i}u_{i,p,t}\cdot f_{i,p,t}\right). \quad (3)$$

Operation of the optimizer component 408 in the online case—where the optimizer component 408 receives requests and adapts the long-term schedule responsive to receipt of the request, is now set forth. The assumption made in the offline case that the optimizer component 408 is aware of all requests at time t=0, e.g., $a_i=0$, can be unreasonable. An exemplary process that can be employed by the optimizer component 408 when used online has three main properties: it enables online handling of requests, it makes incremental changes to the solution as new requests arrive, and it updates the promised α values progressively.

With respect to such process, time can be indexed by τ. When time step τ starts, the process employed by the optimizer component 408 becomes aware of requests i whose aware time is τ, e.g., $a_i=\tau$. The collection of requests that are relevant at time τ can be denoted by $R(\tau)=\{i:a_i\leq\tau, d_i\geq\tau\}$. Derivation of such process is described herein in stages.

A first design is presented, wherein the process is incremental in nature and chooses the α values greedily. The system of inequalities the online process utilizes to solve at time τ by the linear program LP(τ) is denoted as follows:

$$\sum_{\substack{i:i\in R(\tau)\\ \max\{\tau,b_i\}\leq t\leq d_i}}\sum_{\substack{p\in P_i:f_{i,p,t}\\ e\in p}} \leq c_e \quad \forall e\in E, \forall \tau\leq t\leq T$$

$$F_{i,\tau-1} + \sum_{t=\max\{\tau,b_i\}}^{d_i}\sum_{p\in P_i f_{i,p,t}} \geq \alpha_{a_i}\cdot D_i \quad \forall i\in R(\tau)$$

$$f_{i,p,t}\geq 0 \quad \begin{array}{l}\forall i\in R(\tau),\\ \forall \max\{\tau,b_i\}\leq t\leq d_i, \forall p\in P_i\end{array}$$

$F_{i,\tau-1}=\sum_{t=b_i}^{\tau-1}\sum_{p\in\mathcal{P}_i}f_{i,p,t}$ can be defined as the total flow already routed by the process before time τ for request $i\in R(\tau)$, and by $\alpha_i$, the promised fraction of request i's demand that the process scheduled. It can be noted that $F_{i,\tau-1}$ is a constant when operating at time step τ.

The online process at time τ uses the solution from the previous time step as its starting point. Thereafter, given values for $\alpha_i$s, the process executes the offline algorithm to determine whether there is a feasible solution or not for the given $\alpha_i$ values. The process can determine the $\alpha_i$ values, as requests i that are not new, e.g., $\alpha_i < \tau$, already have a promised $\alpha_i$ value from the previous time step. Newly aware requests i, e.g., $\alpha_i = \tau$, can initially be set to have at $\alpha_i = 0$. The process can conduce a "water filling" process, in which the lowest $\alpha$ scores are increased as long as LP(τ) is feasible.

Relative to the offline process, the following changes can be made: condition (*) is changed to:

$$\frac{\sum_{e \in p^*} \frac{y_{e,t^*}}{c_e}}{\sum_{e \in E} \sum_{t=0}^{T} y_{e,t}} \le \frac{\frac{1}{\alpha \cdot D_{i^*} - F_{i^*,\tau-1}} \cdot z_{i^*}}{\sum_{i \in R} z_i};$$

when increasing $f_{i^*,p^*,t^*}$ the variable $z_{i^*}$ is updated as follows:

$$z_{i^*} \leftarrow z_{i^*} \cdot e^{-\frac{\gamma}{\alpha_{i^*} \cdot D_{i^*} - F_{i^*,\tau-1}}};$$

γ is changed according to $$\gamma \leftarrow \varepsilon \cdot \min\left\{\alpha \cdot D_{i^*} - F_{i^*,\tau-1}, \min_{e \in p^*}\{c_e\}\right\};$$

i* is removed from R when:

$$F_{i^*,\tau-1} + \Sigma_{t=max\{\tau,b_i\}}^{d_{i^*}} \Sigma_{p \in P_i} * f_{i^*,p,t} \ge \alpha \cdot D_{i^*};$$

the stopping condition of the algorithm is that all the "new" covering constraints are satisfied. Similarly to Eq. (1) and Eq. (2), $y_{e,t}$ and $z_i$ are maintained to uphold the following definitions:

$$y_{e,t} = \exp\left(\frac{N}{\varepsilon \cdot c_e} \sum_{\substack{i : i \in R(\tau) \\ max\{\tau,b_i\} \le t \le d_i}} \sum_{\substack{p \in P_i : f_{i,p,t} \\ e \in p}}\right) \quad (4)$$

$$z_i = \exp\left(-\frac{N}{\varepsilon \cdot (\alpha_i \cdot D_i - F_{i,\tau-1})} \sum_{t=max\{\tau,b_i\}}^{d_i} \sum_{p \in P_i f_{i,p,t}}\right) \quad (5)$$

A problem that exists with the above online incremental solution is that it essentially chooses the α values in a greedy manner, which may cause a wide variation in the sequence $\mu_0, \alpha_1, \ldots$, and some αs may have a very small value.

In order to sustain fairness over time, the concept of traffic smoothening can be introduced. Intuitively, this can be done by limiting the capacity the incremental online process can use, leaving some capacity vacant for future requests. Formally, $\beta_{e,t,\tau}$ can denote the fraction of the capacity of edge e in future time t that can be used by the online incremental process when running at time step τ. This changes the capacity constraint of LP(τ) as follows:

$$\sum_{\substack{i : i \in R(\tau) \\ max\{\tau,b_i\} \le t \le d_i}} \sum_{\substack{p \in P_i : f_{i,p,t} \\ e \in p}} \le \beta_{e,t,\tau} c_e \quad \forall e \in E, \forall \tau \le t \le T$$

Given an edge e∈E and a time t, the following function is non-decreasing in τ: $\beta_{e,t,\tau}: [0, \ldots, t] \to [0,1]$. $\beta_{e,t,t}$ can be set to 1, since when the online process reaches time step τ=t, the entire capacity of the edge can be used as there is no reasons to save vacant capacity for future uses. For example, an exemplary choice is $\beta_{e,t,\tau} = \exp(-(t-\tau)/c)$ for some constant c.

Based on the forgoing, the following changes to Eq. (1) can be implemented: a rule can be updated for $y_{e,t^*}$, where $$y_{e,t^*} \leftarrow y_{e,t^*} \cdot e^{\frac{\gamma}{\beta_{e,t^*,\tau} \cdot c_e}} \forall e \in p^*;$$

condition (*) changes to:

$$\frac{\sum_{e \in p^*} \frac{y_{e,t^*}}{\beta_{e,t^*,\tau} \cdot c_e}}{\sum_{e \in E} \sum_{t=0}^{T} y_{e,t}} \le \frac{\frac{1}{\alpha \cdot D_{i^*} - F_{i^*,\tau-1}} \cdot z_{i^*}}{\sum_{i \in R} z_i};$$

$y_{e,t}$ is initialized and updated to maintain the following definition:

$$y_{e,t} = \exp\left(\frac{N}{\varepsilon \cdot \beta_{e,t,\tau} \cdot c_e} \sum_{\substack{i : i \in R(\tau) \\ max\{\tau,b_i\} \le t \le d_i}} \sum_{\substack{p \in P_i : f_{i,p,t} \\ e \in p}}\right). \quad (6)$$

In the online case when operating at time τ, one can improve results obtained by the traffic smoothening approach. As the optimizer component 408, when employing the online process, applies water filling at each time step τ, it might be the case that some of the α values can be improved. At each time step τ, after the online process (with traffic smoothening terminates), the same algorithmic approach can be applied with a utility constraint. LP'(τ) can denote the system of inequalities the online process needs to solve at time τ with utility $g(\vec{f})$:

$$\sum_{\substack{i : i \in R(\tau) \\ max\{\tau,b_i\} \le t \le d_i}} \sum_{\substack{p \in P_i : f_{i,p,t} \\ e \in p}} \le \beta_{e,t,\tau} c_e \quad \forall e \in E, \forall \tau \le t \le T$$

$$F_{i,\tau-1} + \sum_{t=max\{\tau,b_i\}}^{d_i} \sum_{p \in P_i} f_{i,p,t} \le D_i \quad \forall i \in R(\tau)$$

$$\sum_{i \in R(\tau)} \left(U_{i,\tau-1} + \sum_{p \in P_i} \sum_{t=max\{\tau,b_i\}}^{d_i} u_{i,p,t} \cdot f_{i,p,t}\right) \ge U$$

$$f_{i,p,t} \ge 0 \quad \forall i \in R(\tau), \forall \max\{t, b_i\} \le t \le d_i, \forall p \in P_i.$$

$U_{i,\tau-1} = \Sigma_{p \in P_i} \Sigma_{t=b_i}^{\tau-1} u_{i,p,t} \cdot f_{i,p,t}$ can be defined as the total utility of flow already routed by the process before time τ for request i∈R(τ). It can be noted that $U_{i,\tau-1}$ is a constant when operating at time step τ.

The second constraint states that the total flow of request i should not exceed its total demand $D_i$ (this is a packing constraint). The third constraint states that the total utility is at least some given value F (this is a covering constraint). It can be noted that the second constraint is not needed in LP and LP($\tau$), but is needed here with LP'($\tau$).

When considering such constraints, the following changes to Eq. (1) can be incorporated into the optimizer component 408: internal variables $s_i$ can be added, where $\forall i \in R(\tau)$; when increasing $f_{i^*,p^*,t^*}$, $s_{i^*}$ is updated as follows:

$$s_{i^*} \leftarrow s_{i^*} \cdot e^{\frac{\gamma}{D_{i^*} - F_{i^*,\tau-1}}};$$

condition (*) is changed to:

$$\frac{\sum_{e \in p^*} \frac{y_{e,t^*}}{\beta_{e,t^*,\tau} \cdot c_e} + \frac{s_{i^*}}{D_{i^*} - F_{i^*,\tau-1}}}{\sum_{e \in E} \sum_{t=0}^{T} y_{e,t} + \sum_{i \in R(\tau)} s_i} \leq \frac{u_{i^*,p^*,t^*}}{U - \sum_{i \in R(\tau)} U_{i,\tau-1}};$$

the stopping condition of the process is that the utility constraint is satisfied; $\gamma$ is chosen to be $$\gamma \leftarrow \varepsilon \cdot \min\left\{D_{i^*} - F_{i^*,\tau-1}, \min_{e \in p^*}\{c_e\}, \frac{U - \sum_{i \in R(\tau)} U_{i,\tau-1}}{u_{i^*,p^*,t^*}}\right\}.$$

The internal variables $y_{e,t}$, $s_i$, and $r$ are maintained, such that Eq. (6) remains unchanged, and the following holds:

$$s_i = \exp\left(-\frac{N}{\varepsilon \cdot (D_i - F_{i,\tau-1})} \sum_{p \in P_i} \sum_{t=\max\{\tau,b_i\}}^{d_i} f_{i,p,t}\right) \quad (7)$$

$$r = \exp\left(\frac{N \cdot u_{i,p,t}}{\varepsilon \cdot \left(U - \sum_{i \in R(\tau)} U_{i,\tau-1}\right)} \sum_{p \in P_i} \sum_{\max\{\tau,b_i\}}^{d_i} f_{i,p,t}\right) \quad (8)$$

As indicated in Theorem 1, the optimizer component 408 may produce a solution that violates the capacity constraints by a small multiplicative factor of at most (1+3$\varepsilon$). This may happen both in traffic smoothening and utility incorporation. This is not an issue, however, since exceeding $\beta_{e,t,\tau} \cdot c_e$ units of flow on edge e at time t scheduled by the online process at time $\tau$ and the edge's capacity $c_e$. This approach allows for acceptance of small capacity violations generated by the optimizer component 408 without actually violating the capacity at all in the final output, which results in higher $\alpha$ values.

It can be ascertained that the online case has no theoretical performance guarantees, although it can be proven that when the appropriate system of inequalities is feasible, then the process used by the optimizer component 408 will not get stuck; that is, there is always a variable $f_{i^*,p^*,t^*}$ that can increase implying that the ratio of the derivative of the smoothening of the worst packing constraint and the derivative of the smoothening of the worst packing constraint is upper bounded by 1. This holds for any current solution $\vec{f}$. This is summarized in the following theorem:

Theorem 3:

For any $\vec{f}$, if LP, LP($\tau$) and LP'($\tau$) are feasible, then there is always a i*, p*, and t* such that the respective condition (*) holds.

As reference above, high-priority requests (e.g., ad-hoc requests) are desirably satisfied. It can be assumed that all high priority requests are broken into small chunks, each having $a_i = b_i = d_i$, e.g., each high priority request spans exactly a single time step. The process referenced above has prior estimation of the fraction of the capacity $c_e$ of edge e at time t that will be needed for high priority requests. This fraction can be denoted by $X_{e,t}$. This incurs the following adaption of the process previously mentioned: $c_e$ is replaced with $(1-X_{e,t}) \cdot c_e$. Since Xs are estimations, it may be the case that once time step t arrives and the process becomes aware of the actual high priority requests, it becomes apparent that more than a $X_{e,t}$ fraction of the capacity of edge e is needed. In this case, the process can be configured to reduce some pre-scheduled flow on edge e, which can be accomplished by formulating a small linear program that corrects the pre-scheduled flow on edge e while minimizing the effect on the promise guarantees $\alpha_i$ provided by the optimizer component 408.

In another exemplary embodiment, to speed up the running time, it may be desirable to consider use of a sliding window approach. Given a window size W, if the online process is at time step $\tau$, it only looks W time steps ahead into the future. A potential issue with this approach is that there may be requests i for which $d_i - a_i > W$, e.g., at the time in which the process becomes aware of request i it ends after the current window.

A solution for this potential issue is to break this request into smaller requests. Specifically, once the process becomes aware of the request i as above at time $\tau$, it considers its deadline to be the current end time of the sliding window: $\tau + W$. Additionally, its demand is set to be the proportion of its original demand that fits into the current sliding window. With more particularity, the demand can be determined by the following formula when the online process of the optimizer component 408 is at time $\tau$:

$$= D_i * \frac{W}{d_i - \tau} \text{ iff } b_i \leq \tau \leq d_i \text{ and } d_i > W$$

$$= D_i \text{ otherwise.}$$

At any subsequent time steps the total of the flow of request i scheduled can be subtracted from $D_i$.

It can be ascertained that the optimizer component 408 must operate in a relatively tight time-scale. Accordingly, the process described above can be modified to facilitate expediting of its execution. For example, the shortest path problem can be decomposed. Finding an (i,t,p) tuple that satisfies (*) can be substantially similar to executing an all-pairs shortest path process on an expanded graph, which includes one copy of the original network for every time instance. Doing so, however, may be too costly in view of the large problem instances that may be considered by the scheduler component 118. Thus, as alluded to above, the network graph 402 can be constrained. For instance, for each source-destination pair, a sorted by length list of paths can be retained for each copy of the graph (a path's length is the sum of lengths of its edges; the edge length is given by $$\frac{y_e}{c_e}).$$

The shortest path for each source destination pair can be obtained by taking the minimum length path among all copies; an advantage of such decomposition is that shortest paths can be searched for on much smaller graphs.

In view of the above, it can be observed that in any iteration of the process, shortest-path can be calculated only for the time instance corresponding to the last update (e.g., where such time instance is denoted by t). Further, the shortest path (corresponding to time t) need only be calculated for users whose current shortest path has joint edges with the path whose flow has been augmented. This results in fewer updates in each iteration, rendering the process more efficient.

Moreover, the process set forth above can be parallelized. Incrementing the flow variables $f_{i,p,t}$ and updating corresponding internal variables $y_{e,t}$ and $z_i$ can be done in parallel, so long as there is no contention in the time dimension, and further a request is assigned to only one thread at a time. To obey these constraints, the total time can be divided into time ranges, where each time range is assigned to a different thread. Specific time-ranges can be chosen in a manner that roughly equalizes the "load" (request count) in each range. The parallelization is straightforward when each request is "alive" in exactly one time range. Requests, however, may span multiple time ranges. To address this challenge, the request can be assigned to a specific time range with probability equal to the relative mass of the request in that time range. Such assignment guarantees that the constraints described above are indeed enforced. In a scatter phase, each thread runs a given number of iterations (which can be set—e.g., $10^4$). The following gather phase then updates the values of all variables. While some covering constraint remains unsatisfied and feasible edits to $f_{i,p,t}$ based on condition * remain possible, the optimization component 408 repeats the above scatter and gather phases. Note that a request spanning multiple time ranges can be assigned to different threads in different scatter phases. Towards the end of the execution, where the number of unsatisfied requests is small, the process can switch to single-thread execution (e.g., the parallelization overhead becomes meaningful).

Summarizing at least some of the above, an exemplary algorithm that can be used by the optimizer component 408 can be classified as a mixed packing and covering algorithm. The process identifies a solution by making small yet provably safe changes to the variables, such that there is a bound on overshoot violations on the packing constraint. When new constraints appear (e.g., new transfers at a next time step or a change in network conditions), the process can use the "old" converged state (e.g., the problem need not be solved from scratch, but can start from a previous converged state). The process allows for promises to be made to requesters, where the promise guarantees that a transfer request will be met despite new arrivals, high priority (ad-hoc) requests, and changing network conditions. This can be accomplished by setting aside a particular amount of future network resources—at a next time step (from current time), resources can be entirely allocated, while for time steps in the future, increasing amounts of resources can remain unallocated. Further, such process can be parallelized for practical implementation.

Figure 6:
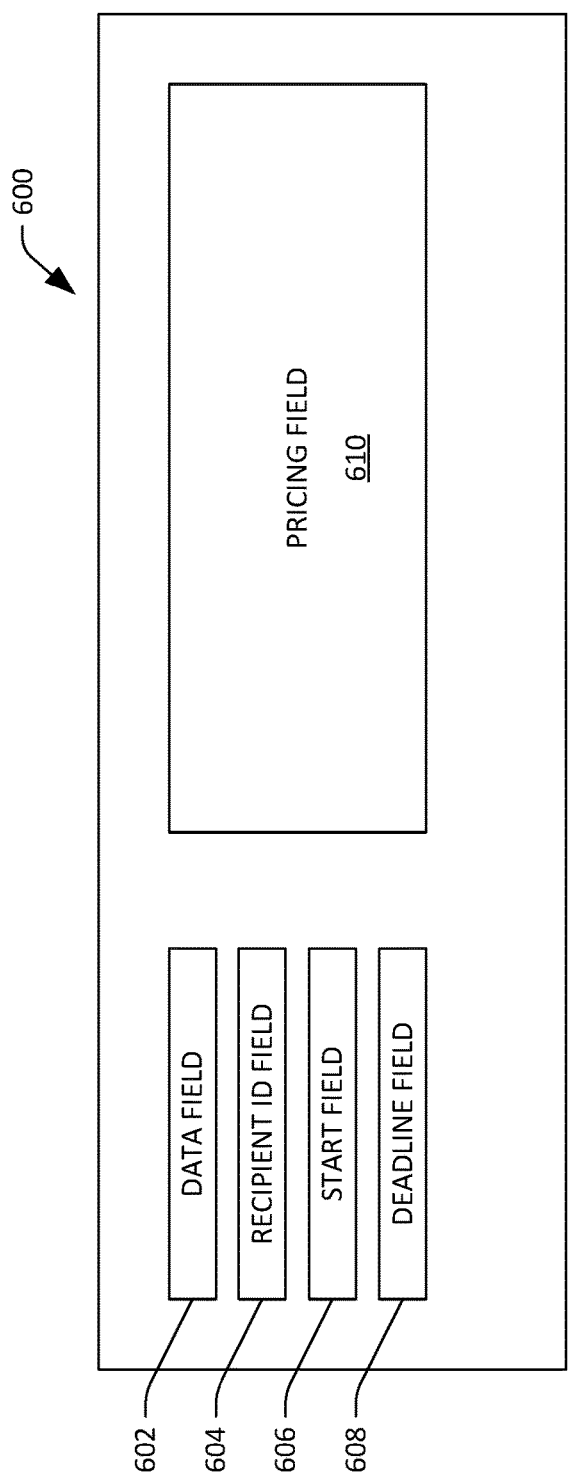
FIG. 6 is an exemplary graphical user interface that can be exposed to a customer to facilitate receipt of a request for a data transfer over the network.

With reference to FIG. 6, an exemplary graphical user interface 600 that can be exposed to an owner of data retained in at least one computing device of the network 102 is illustrated. The graphical user interface 600 includes a data field 602 that is configured to receive identification of data that is to be transferred from a source computing device to a recipient computing device. For instance, based upon an identification of the data that is referenced in the data field 602, a volume of the data that is being requested to be transferred from the source computing device to the recipient computing device can be ascertained.

The graphical user interface 600 additionally includes a recipient ID field 604 that identifies a recipient computing device in the network 102. The graphical user interface 600 may optionally include a start field 606 that is configured to receive an identification of a time when the transfer of the data to the recipient computing device identified in the recipient ID field 604 can begin. If the start field 606 is omitted from the graphical user interface 600 or a start time is not specified, then an assumption can be made that the transfer of the data can immediately begin. The graphical user interface 600 also includes a deadline field 608 that can receive an indication of when the transfer of the data from the source computing device to the recipient computing device identified in the recipient ID field 604 is to be completed. Based upon the data set forth in the fields 602-608, pricing information can be presented in a pricing field 610. The pricing information can change, for example, as a deadline set forth in the deadline field 608 changes, as an amount of data in the data field changes 602, etc. Accordingly, it can be ascertained that the graphical user interface 600 facilitates specification of an absolute deadline, where the transfer of data is to be completed prior to the deadline. The scheduler component 118 can consider the deadline when determining whether to accept or reject the request, and can compute the long-term schedule 124 and the short-term schedule 126 based upon the deadline.

Figure 7:
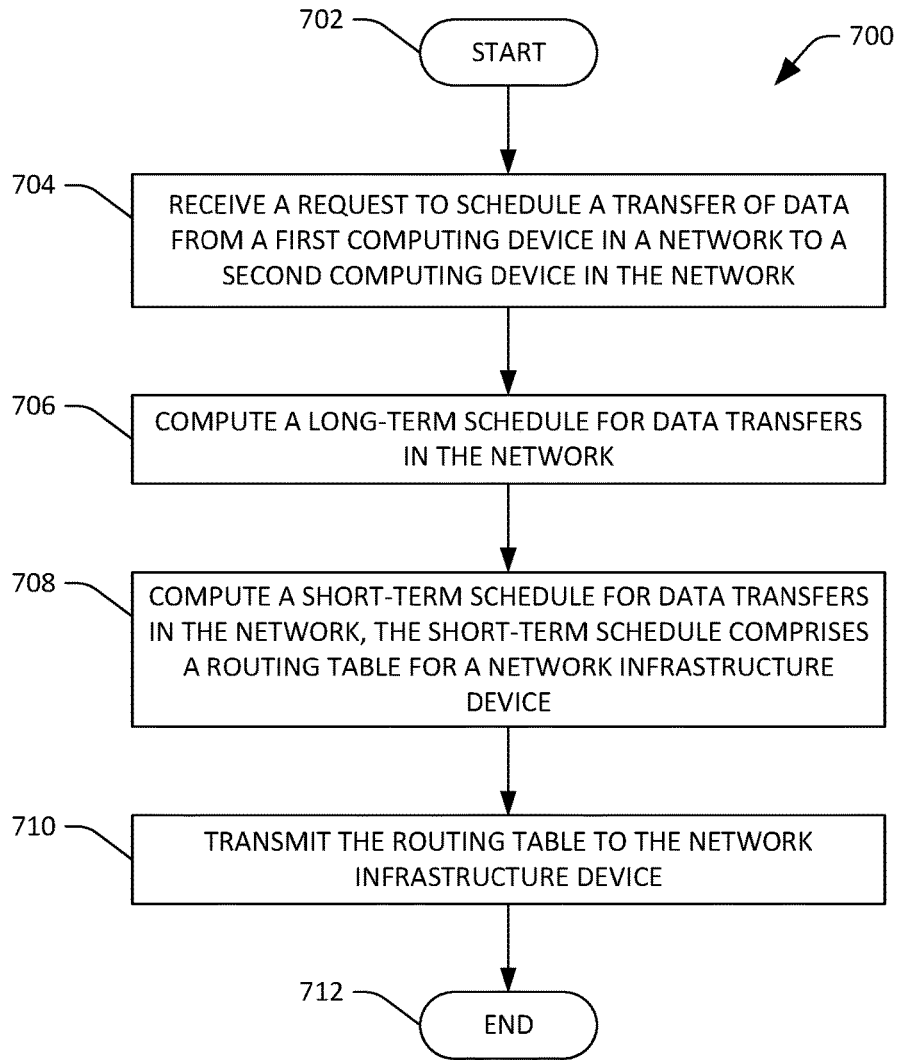
FIG. 7 is a flow diagram illustrating an exemplary methodology for scheduling data transfers in the network.
Figure 8:
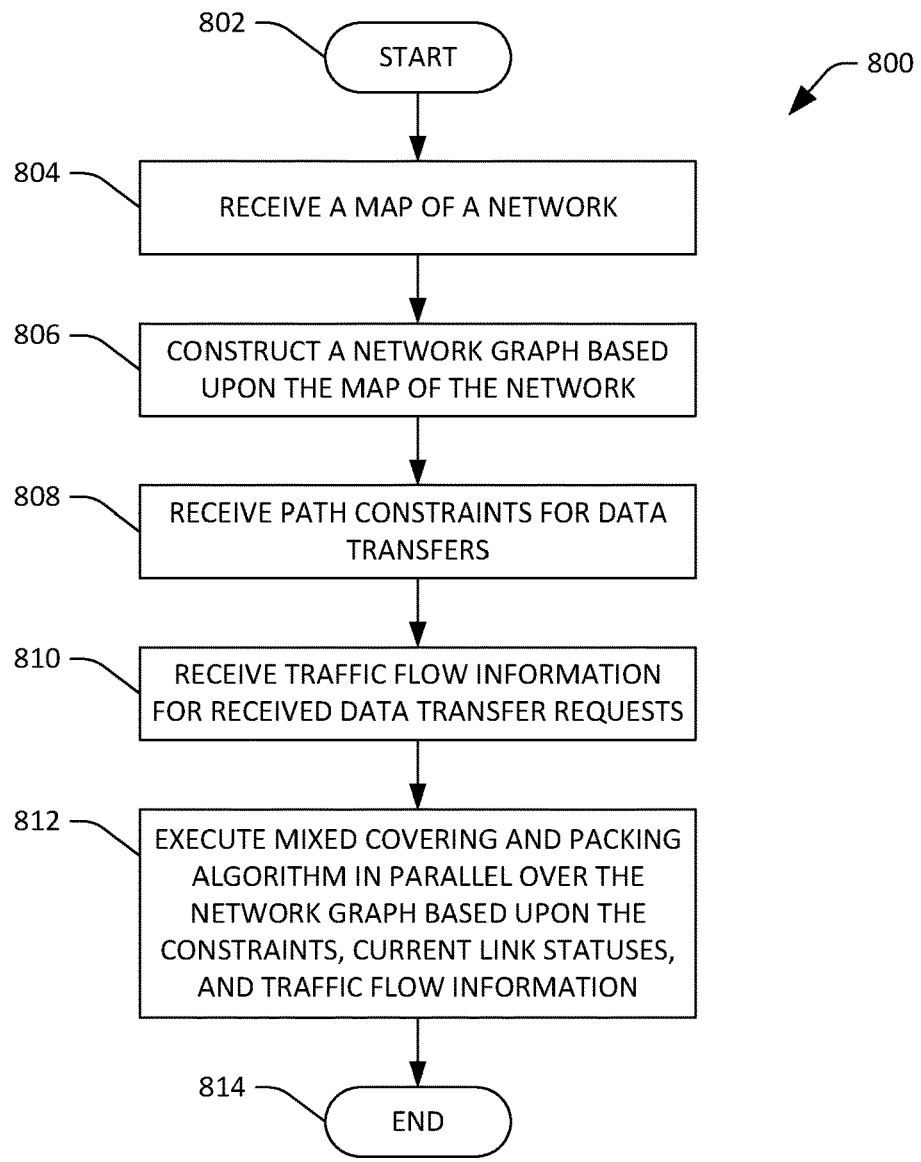
FIG. 8 is a flow diagram illustrating an exemplary methodology for computing a long-term schedule for data transfers in the network.
Figure 9:
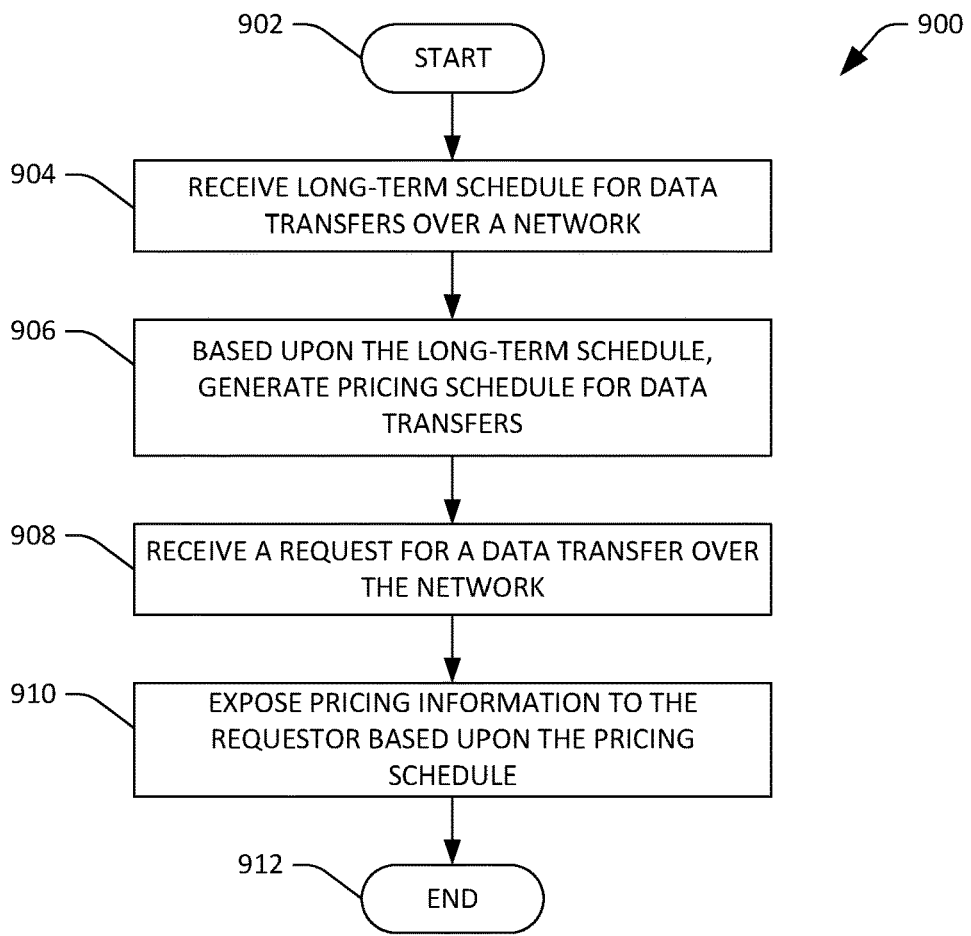
FIG. 9 is a flow diagram illustrating an exemplary methodology for exposing a price schedule corresponding to transfer of data in the network.

FIGS. 7-9 illustrate exemplary methodologies relating to scheduling data transfers in a network. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

With reference now to FIG. 7, an exemplary methodology 700 that facilitates computation of a long-term schedule is illustrated. The methodology 700 starts at 702, and at 704, a request to transfer data from a first computing device in a network to a second computing device in the network is received. As indicated above, the request comprises first data that identifies the second computing device, second data that identifies a volume of data to be transferred from the first computing device to the second computing device in accordance with the request, and third data that identifies a deadline, wherein the transfer of the data from the first computing device to the second computing device is to be completed prior to the deadline.

Responsive to receiving the request and based at least in part upon the request, at 706 a long-term schedule for data transfers in the network is generated. As indicated above, an optimization process is used to compute the long-term schedule. The long-term schedule covers a plurality of future time units and is generated to facilitate completion of the transfer of the volume of the data from the first computing device to the second computing device prior to the deadline. Further, the long-term schedule identifies, for at least one future time unit in the plurality of future time units, a path in the network over which data is to be transferred from the first computing device to the second computing device.

At 708, based upon the long-term schedule, a short-term schedule is generated for data transfers in the network, wherein the short-term schedule is generated to facilitate completion of the transfer of the data from the first computing device to the second computing device prior to the deadline. The short-term schedule comprises a routing table for a network infrastructure device in the network. The routing table identifies at least one device to which data received by the network infrastructure device is to be transferred. At 710, the routing table is transmitted to the network infrastructure device, and the methodology 700 completes at 712.

With reference now to FIG. 8, an exemplary methodology 800 that facilitates generating the long-term schedule is illustrated. The methodology 800 starts at 802, and at 804 a map of a network is received. As indicated above, the map of the network comprises a plurality of nodes that are representative of devices in the WAN and a plurality of edges that are representative of network links between devices in the network. At 806, a network graph is constructed based upon the map of the network. The network graph comprises a plurality of instances of the map of the network: one instance of the map of the network for each time unit covered by the long-term schedule. At 808, path constraints for data transfers are received. Such path constraints can restrict paths over which data to be transferred from a source computing device to a recipient computing device can travel.

At 810, information about pending data transfer requests is received. Such information can include a respective volume of data remaining to be transferred for each request, a respective deadline of the request, amongst other information. At 812, a mixed packing and covering algorithm is executed in parallel over the network graph based upon the network graph, the path constraints, and the information received 810. It is to be understood that it is contemplated that other types of algorithms are contemplated for computing the long-term schedule. For instance, a linear program can be resolved in connection with computing the long-term schedule. The methodology 800 completes at 814.

Turning now to FIG. 9, an exemplary methodology 900 that facilitates exposing pricing information about data transfers over a network is illustrated. The methodology starts at 902, and at 904 a long-term schedule for data transfers over a network is received. At 906, based upon the long-term schedule, a pricing schedule for data transfers is generated. This pricing schedule can be configured to smooth the demand for data transfers in the network over time, thereby increasing efficiency of utilization of hardware resources of the network. At 908, a request for a data transfer over the WAN is received, wherein the request includes an amount of data to be transferred and a deadline prior to which the transfer is to be completed. At 910, pricing information is exposed to the requester based upon the pricing schedule and the received request. The requester of the data transfer may then accept the price or modify the request based upon the pricing information. The methodology 900 completes at 912.

Figure 10:
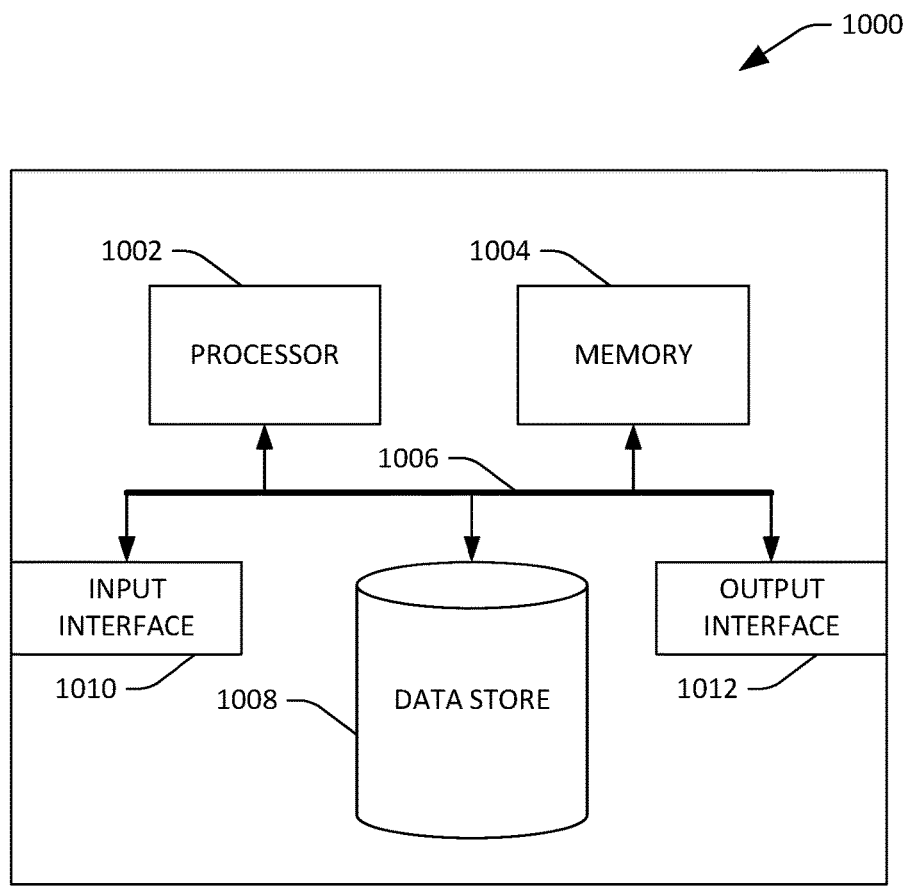
FIG. 10 is an exemplary computing system.

Referring now to FIG. 10, a high-level illustration of an exemplary computing device 1000 that can be used in accordance with the systems and methodologies disclosed herein is illustrated. For instance, the computing device 1000 may be used in a system that supports computing a long-term schedule for data transfers in a network. By way of another example, the computing device 1000 can be a source computing device or a recipient computing device in the network 102. The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store routing tables, long-term schedules, short-term schedules, etc.

The computing device 1000 additionally includes a data store 1008 that is accessible by the processor 1002 by way of the system bus 1006. The data store 1008 may include executable instructions, data transfer schedules, etc. The computing device 1000 also includes an input interface 1010 that allows external devices to communicate with the computing device 1000. For instance, the input interface 1010 may be used to receive instructions from an external computer device, from a user, etc. The computing device 1000 also includes an output interface 1012 that interfaces the computing device 1000 with one or more external devices. For example, the computing device 1000 may display text, images, etc. by way of the output interface 1012.

It is contemplated that the external devices that communicate with the computing device 1000 via the input interface 1010 and the output interface 1012 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1000 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1000 may be a distributed system. Thus, for instance, several devices may be in communication by way of a network connection and may collectively perform tasks described as being performed by the computing device 1000.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method comprising:
receiving a request to transfer data from a first computing device in a network to a second computing device in the network, the request comprises:
an identity of the second computing device;
an identity of a volume of data to be transferred from the first computing device to the second computing device in accordance with the request; and
a deadline, the deadline identifies a time, wherein the transfer of the data from the first computing device to the second computing device is to be completed prior to the time identified in the deadline;
responsive to receiving the request and based upon the request, computing a long-term schedule that covers a first window of time that includes a plurality of time units, the long-term schedule generated to facilitate completion of the transfer of the data from the first computing device to the second computing device prior to the time identified in the deadline, the long-term schedule identifies, for a time unit in the plurality of time units, at least one path in the network over which the data is to be transferred from the first computing device to the second computing device;
based upon the long-term schedule, computing a short-term schedule that covers a second window of time that occurs prior to the first window of time, the short-term schedule comprises fewer time units than the long-term schedule, the short-term schedule computed to facilitate completion of the transfer of the volume of the data from the first computing device to the second computing device prior to the time identified in the deadline, the short-term schedule comprising a routing table for a network infrastructure device in the network, the routing table identifies at least one device to which data received by the network infrastructure device is to be transferred; and
transmitting the routing table to the network infrastructure device, wherein the network infrastructure device transfers the data to the at least one device in accordance with the routing table.

2. The method of claim 1, further comprising:
receiving a map of the network, the map of the network comprising a plurality of nodes that are respectively representative of devices in the network, the map of the network further comprising a plurality of edges that are representative of links between respective devices in the network; and
generating the long-term schedule based upon the map of the network.

3. The method of claim 2, further comprising:
responsive to receipt of the map of the network, constructing a network graph that is representative of the network over the plurality of time units, the network graph comprises a plurality of instances of the map of the network that respectively correspond to the plurality of time units, the plurality of instances of the map of the network connected with one another by way of edges between nodes in the plurality of instances of the map of the network that represent common devices, and wherein the long-term schedule is generated based upon the network graph.

4. The method of claim 3, further comprising, for the data transfer between the first computing device and the second computing device, constraining a number of paths represented in the network graph that can be used to transfer the data from the first computing device to the second computing device to a threshold number of potential paths, wherein generating the long-term schedule is based upon the threshold number of potential paths.

5. The method of claim 1, further comprising:
receiving a plurality of requests for a respective plurality of data transfers between various computing devices in the network, the plurality of requests specifying a respective plurality of deadlines, the respective plurality of deadlines being different; and
generating the long-term schedule based upon the plurality of requests, the long-term schedule generated to facilitate completion of the data transfers between the various computing devices in the network prior to their respective plurality of deadlines.

6. The method of claim 1, further comprising:
subsequent to transmitting the routing table to the network infrastructure device, receiving a second data transfer request to transfer second data from a third computing device in the network to a fourth computing device in the network, the second request comprising:
an identity of the fourth computing device;

an identity of a volume of data to be transferred from the third computing device to the fourth computing in accordance with the second request; and a second deadline, the second deadline identifies a second time, wherein the transfer of the data from the third computing device to the fourth computing device is to be completed prior to the second time identified in the deadline, the second time being different from the first time;

responsive to receiving the second request and based upon the first request and the second request, computing a second long-term schedule that covers a third window of time that includes a second plurality of time units, the second long-term schedule generated to facilitate completion of the transfer of the data from the first computing device to the second computing device prior to the time identified in the deadline and to facilitate completion of the transfer of the second data from the third computing device to the fourth computing device prior to the second time identified in the second deadline, the long-term schedule identifies, for a second time unit in the second plurality of future time units, a first path in the network over which the data is to be transferred from the first computing device to the second computing device and a second path in the network over which the second data is to be transferred from the third computing device to the fourth computing device; and based upon the second long-term schedule, generating a second short-term schedule that covers a fourth window of time that occurs prior to the third window of time, the second short-term schedule comprises fewer time units than the second long-term schedule, the second short-term schedule generated to facilitate completion of the transfer of the data from the first computing device to the second computing device prior to the time identified in the deadline and to facilitate completion of the transfer of the second data from the third computing device to the fourth computing device prior to the second time identified in the second deadline, the second short-term schedule comprising a second routing table for the network infrastructure device in the network; and transmitting the second routing table to the network infrastructure device.

7. The method of claim 1, wherein the long-term schedule is computed in parallel over multiple processor cores.

8. The method of claim 1, further comprising:
assessing a charge to an owner of the data that is to be transferred from the first computing device to the second computing device based upon the volume of the data and the time identified in the deadline.

9. The method of claim 1, further comprising dynamically adjusting prices to charge to owners of data that request data transfers over the network, wherein the prices are dynamically adjusted based upon the long-term schedule.

10. The method of claim 1, further comprising exposing a pricing schedule to owners of data in computing devices in the network, the pricing schedule comprises prices that are based upon historic data transfers in the network.

11. The method of claim 1, wherein computing the long-term schedule comprises executing a mixed packing and covering algorithm to compute the long-term schedule.

12. The method of claim 1, further comprising:
receiving an indication that at least one link in the network is down; and computing the long-term schedule based upon the indication that the at least one link in the network is down.

13. A controller computing device comprising:
at least one processor; and
memory that stores instructions that, when executed by the at least one processor, cause the at least one processor to perform acts comprising:
receiving a plurality of data transfer requests, each data transfer request comprising:
an identity of a volume of data that is to be transferred; and
a deadline that identifies a respective time, each data transfer request being a request to transfer data over a network that comprises a plurality of network infrastructure devices, each data transfer request to be completed prior to the respective time identified in the deadline;
computing a long-term schedule based upon the plurality of data transfer requests, the long-term schedule covers a first time window that includes a plurality of time units, the long-term schedule defines flow of traffic through the network for each time unit in the plurality of time units;
computing a short-term schedule based upon the long-term schedule, the short-term schedule covers a second time window that is shorter than the first time window and occurs prior to the first time window; and
causing respective routing tables to be transmitted to the plurality of network infrastructure devices based upon the short-term schedule, wherein the plurality of network infrastructure devices route data packets in the network based upon the routing tables.

14. The computing device of claim 13, wherein computing the long-term schedule comprises executing a mixed packing and covering algorithm.

15. The computing device of claim 13, wherein the long-term schedule and the short-term schedule are adjacent to one another in time.

16. The computing device of claim 13, wherein the plurality of time units have a uniform time duration.

17. The computing device of claim 13, the acts further comprising receiving a map of the network that identifies devices in the network and links between the devices, the long-term schedule computed based upon the map of the network.

18. The computing device of claim 13, the acts further comprising:
generating a price schedule based upon the long-term schedule; and
exposing the price schedule to requesters of data transfers.

19. The computing device of claim 13, the acts further comprising:
receiving a map of the network; and
constructing a network graph based upon the map of the network, the map of the network comprising a plurality of nodes that are respectively representative of the plurality of network infrastructure devices, the network graph comprises a plurality of instances of the map of the network for the plurality of future time units, respectively, and wherein the long-term schedule is computed based upon the network graph.

20. A computer-readable storage medium comprising instructions that, when executed by a processor, cause the processor to perform acts comprising:

receiving a request to transfer data from a first device in a network to a second device in the network, the request comprising:
- an identity of the second device;
- an indication of a volume of the data to be transferred from the first device in the network to the second device in the network; and
- a deadline that identifies a time, wherein the transfer of the data from the first device to the second device is to be completed prior to the time identified in the deadline;

responsive to receiving the request and based upon the request, computing a long-term schedule that covers a first time window, the first time window includes a plurality of time units, wherein the long-term schedule defines, for each time unit in the plurality of time units, flow of traffic through the network, and further wherein the long-term schedule is computed to facilitate completion of the transfer of the data from the first device to the second device prior to the time identified in the deadline;

based upon the long-term schedule, computing a short-term schedule that covers a second window of time that includes fewer time units than the first window of time, the second window of time is prior to the first window of time, the short-term schedule computed to facilitate completion of the transfer of the volume of the data from the first device to the second device prior to the time identified in the deadline, the short-term schedule comprising a routing table for a network infrastructure device in the network, the routing table identifies at least one device to which data received by the network infrastructure device is to be transferred; and transmitting the routing table to the network infrastructure device, wherein the network infrastructure device transfers the data to the at least one device based upon the routing table.

* * * * *